(12) United States Patent
Hefetz

(10) Patent No.: US 9,391,985 B2
(45) Date of Patent: *Jul. 12, 2016

(54) ENVIRONMENT-BASED TWO-FACTOR AUTHENTICATION WITHOUT GEO-LOCATION

(71) Applicant: Guy Hefetz, New York, NY (US)

(72) Inventor: Guy Hefetz, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/835,707

(22) Filed: Aug. 25, 2015

(65) Prior Publication Data

US 2016/0050203 A1 Feb. 18, 2016

Related U.S. Application Data

(63) Continuation-in-part of application No. 14/479,266, filed on Sep. 5, 2014, now abandoned, which is a continuation-in-part of application No. 14/145,862, filed on Dec. 31, 2013, now Pat. No. 9,033,225, which is a continuation-in-part of application No.

(Continued)

(51) Int. Cl.
| | |
|---|---|
| *G06K 5/00* | (2006.01) |
| *H04L 29/06* | (2006.01) |
| *H04W 12/08* | (2009.01) |
| *H04W 4/14* | (2009.01) |
| *H04L 12/58* | (2006.01) |
| *G06F 21/44* | (2013.01) |
| *G06F 21/73* | (2013.01) |

(Continued)

(52) U.S. Cl.
CPC ............ *H04L 63/0853* (2013.01); *G06F 21/44* (2013.01); *G06F 21/73* (2013.01); *G06Q 20/3224* (2013.01); *G06Q 20/4014* (2013.01); *G06Q 20/4016* (2013.01); *G06Q 30/06* (2013.01); *G06Q 50/265* (2013.01); *H04L 51/18* (2013.01); *H04L 63/08* (2013.01); *H04L 63/083* (2013.01); *H04L 63/0876* (2013.01); *H04L 63/107* (2013.01); *H04M 15/8033* (2013.01); *H04W 4/008* (2013.01); *H04W 4/02* (2013.01); *H04W 4/14* (2013.01); *H04W 12/06* (2013.01); *H04W 12/08* (2013.01); *G06F 2221/2111* (2013.01)

(58) Field of Classification Search
CPC .. G07F 7/1016; G07F 7/1025; G07C 9/00126
USPC ............... 235/380, 382, 385, 462.45, 472.01, 235/472.02
See application file for complete search history.

(56) References Cited

U.S. PATENT DOCUMENTS

| | | | | |
|---|---|---|---|---|
| 5,945,944 A | * | 8/1999 | Krasner | G01S 5/0036 342/357.46 |
| 6,012,144 A | * | 1/2000 | Pickett | G06Q 20/04 380/33 |

(Continued)

*Primary Examiner* — Daniel St Cyr
(74) *Attorney, Agent, or Firm* — James P. Demers

(57) ABSTRACT

The invention provides a method and system for accomplishing two-factor authentication for internet transactions, wherein the user of the device through which the transaction is negotiated needs to give only a single yes/no verification to the system. In some embodiments, the second factor authentication is automated without any action on the part of the user. The method calls on the user's wireless voice device for the detection of environmental wireless signals ("Short Distance Wireless Information" or "SDWI"), and uses these signals collectively as a "fingerprint" that uniquely identifies the wireless signals near the wireless voice device. The system stores these SDWI fingerprints, and later uses the stored information to establish whether or not the user's wireless voice device is near a previously-recognized SDWI.

18 Claims, 7 Drawing Sheets

Related U.S. Application Data

13/479,235, filed on May 23, 2012, now Pat. No. 8,770,477, which is a continuation-in-part of application No. 13/065,691, filed on Mar. 28, 2011, now Pat. No. 8,640,197, which is a continuation-in-part of application No. 12/260,065, filed on Oct. 28, 2008, now abandoned, which is a continuation-in-part of application No. 11/346,240, filed on Feb. 3, 2006, now Pat. No. 7,503,489, said application No. 13/065,691 is a continuation-in-part of application No. 12/600,808, filed as application No. PCT/US2007/012552 on May 29, 2007, now Pat. No. 8,370,909, said application No. 13/065,691 is a continuation-in-part of application No. 12/357,380, filed on Jan. 21, 2009, now Pat. No. 8,656,458, which is a continuation-in-part of application No. 11/405,789, filed on Apr. 18, 2006, now Pat. No. 8,590,007.

(60) Provisional application No. 60/674,709, filed on Apr. 26, 2005, provisional application No. 61/445,860, filed on Feb. 23, 2011, provisional application No. 61/318,329, filed on Mar. 28, 2010, provisional application No. 60/711,346, filed on Aug. 25, 2005.

(51) Int. Cl.
*G06Q 20/32* (2012.01)
*G06Q 20/40* (2012.01)
*G06Q 30/06* (2012.01)
*H04M 15/00* (2006.01)
*H04W 4/00* (2009.01)
*H04W 4/02* (2009.01)
*H04W 12/06* (2009.01)
*G06Q 50/26* (2012.01)

(56) References Cited

U.S. PATENT DOCUMENTS

| | | | |
|---|---|---|---|
| 6,466,779 B1 * | 10/2002 | Moles | H04L 63/02 455/410 |
| 7,865,181 B1 * | 1/2011 | Macaluso | G06F 8/63 455/418 |
| 8,413,898 B2 * | 4/2013 | Heffez | G06Q 20/32 235/380 |
| 9,033,225 B2 * | 5/2015 | Hefetz | G06Q 20/32 235/380 |
| 2013/0091544 A1 | 4/2013 | Oberheide et al. | |
| 2013/0104198 A1 | 4/2013 | Grim | |
| 2013/0312078 A1 | 11/2013 | Oberheide et al. | |
| 2014/0068723 A1 | 3/2014 | Grim et al. | |
| 2014/0245379 A1 | 8/2014 | Oberheide et al. | |
| 2014/0245389 A1 | 8/2014 | Oberheide et al. | |
| 2014/0245450 A1 | 8/2014 | Oberheide et al. | |
| 2015/0040190 A1 | 2/2015 | Oberheide et al. | |
| 2015/0046989 A1 | 2/2015 | Oberheide et al. | |
| 2015/0046990 A1 | 2/2015 | Oberheide et al. | |
| 2015/0074408 A1 | 3/2015 | Oberheide et al. | |
| 2015/0074644 A1 | 3/2015 | Oberheide et al. | |
| 2015/0161378 A1 | 6/2015 | Oberheide et al. | |

* cited by examiner

ENVIRONMENT-BASED TWO-FACTOR AUTHENTICATION WITHOUT GEO-LOCATION

RELATED APPLICATIONS

This is a continuation-in-part of U.S. patent application Ser. No. 14/479,266, filed Sep. 5, 2014, which is a continuation-in-part of U.S. patent application Ser. No. 14/145,862, filed Dec. 31, 2013, which is a continuation-in-part of U.S. patent application Ser. No. 13/479,235, filed May 23, 2012, now U.S. Pat. No. 8,770,477, which is a continuation-in-part of U.S. patent application Ser. No. 13/065,691 filed Apr. 18, 2006, now U.S. Pat. No. 8,640,197, which in turn claims priority of U.S. provisional application No. 61/445,860 filed on Feb. 23, 2011 and U.S. provisional application No. 61/318,329 filed on Mar. 28, 2010.

U.S. patent application Ser. No. 13/065,691 is also a continuation-in-part of U.S. patent application Ser. No. 12/260,065 filed on Oct. 28, 2008 and published Apr. 23, 2009 as document 2009/0102712, which is a continuation-in-part of U.S. patent application Ser. No. 11/346,240 filed on Feb. 3, 2006, now U.S. Pat. No. 7,503,489, which in turn claims priority from U.S. provisional application No. 60/674,709, filed Apr. 26, 2005.

U.S. patent application Ser. No. 13/065,691 is also a continuation-in-part of U.S. patent application Ser. No. 12/357,380, now U.S. Pat. No. 8,656,458, which is a Continuation-in-Part of U.S. patent application Ser. No. 11/405,789 filed on Apr. 18, 2006, now U.S. Pat. No. 8,590,007, which in turn claims priority from U.S. provisional application No. 60/711,346 filed on Aug. 25, 2005.

U.S. application Ser. No. 13/065,691 is also a continuation-in-part of U.S. patent application Ser. No. 12/600,808, filed on May 29, 2007, now U.S. Pat. No. 8,370,909, which in turn is a 371 (National Stage in the US) of PCT/US07/012552 filed May 29, 2007.

U.S. application Ser. No. 13/479,235 is also a continuation-in-part of U.S. patent application Ser. No. 13/290,988, filed on Nov. 7, 2011, now U.S. Pat. No. 8,413,898, which in turn is a divisional of U.S. application Ser. No. 12/260,065, supra.

The contents of each one of the above prior applications is incorporated herein by reference in its entirety.

FIELD OF THE INVENTION

The invention is in the field of authentication of users of wireless technology, to assure the authorized operation of wireless devices and the authorized initiation of internet transactions.

BACKGROUND

It is by now well established that single-factor authentication of internet user identity, typically via passwords, provides inadequate security for financial transactions. Users tend to use short, easily-deduced or easily-guessed passwords, and/or passwords that can be guessed at by automated brute-force methods. Even long, nominally "safe" passwords are regularly stolen from poorly-secured databases. To counter this problem, various forms of two-factor authentication has been developed. Essentially, two-factor authentication requires a would-be user to provide two authentication factors. Something known only to the authorized user (e.g. a login password) is usually combined with something that should only be in the physical possession of the authorized user.

Typical second factors include USB sticks carrying secret tokens, the magnetic strips on bank cards, digital certificates, and biometric identifiers such as fingerprints, retinal or iris patterns, facial recognition, and voice recognition. An increasingly popular second factor involves the use of users' cell phones. Dynamically generated passcodes can be sent to a user's cell phone via SMS messaging, so that possession of the cell phone (and access to incoming text messages) provides the necessary "physically possessed" factor. As an alternative to user-entered passcodes, some systems permit a direct response, via the cell phone itself, to serve as the second factor via a second channel. The remarkable ubiquity of cell phones has made such methods fairly effective, especially where the cell phone itself is the source of the initial login, and/or the device with which the user initiated the transaction. Nonetheless, two-factor identification via cell phones is somewhat inconvenient, in that the user must interact with the phone in some way, in order to convey to the authentication system that he or she does indeed have physical possession of the phone.

Some efforts have been made to reduce the inconvenience of providing a second factor via a cell phone. One such method involves making assumptions about the user's continued possession of the cell phone over a period of time after an initial, successful two-factor authentication. One such assumption is based on physical location: if the user is still using the same computer to login with, and the user's cell phone has not changed location, it is possible to automate the provision of the second factor with reasonable confidence. If the user confirms that the location is an "authorized location", such as his home or office, or a regularly-patronized retail location or restaurant, future requests for the second factor made from the same location can be responded to with an automated reply, provided only that the cell phone can be geo-located at the location from which the initial login originated.

Geo-location methods for cell phones are well-developed. Common methods rely on GPS location (where the phone has GPS capabilities), carrier cell tower signal timing and triangulation, and Wi-Fi geo-location based on detailed maps of Wi-Fi signal sources. The geo-location of a user's phone, however, generally entails acquisition and storage of the user's personal movements over an extended period of time, which is an invasion of privacy requiring, in most jurisdictions, obtaining the consent of the user to have his or her motions tracked. The giving of consent itself requires user interaction with the authentication system, and even if consent is given, the user has been required to trade privacy for convenience.

Grim, in U.S. patent application Ser. Nos. 13/660,976 and 14/071,637 (publication Nos. 20130104198 and 20140068723; both assigned to Toopher Inc. and both incorporated herein by reference in their entireties), describes systems and methods for authenticating defined user actions over a computer network. An authentication service receives an authentication request from an authenticating service to perform an action on behalf of a user. The authentication service then sends a permission request to a mobile device associated with the user, asking the user whether or not the action should be allowed. The user sends a permission response via the mobile device to the authentication service, granting or denying the action. The user may automate future similar responses so long as at least one automation criterion is met (e.g., the physical location of the mobile device.) Information necessary to determine whether an automation criterion is met is stored locally on the mobile device. Toopher requires two clicks by the user in order to automate the user's authentication: one click to "allow" and another click to "automate future transactions." Two actions are also required if none of the automation criteria are met.

Oberheide et al., in a series of US patent applications (Ser. Nos. 13/647,166, 13/953,343, 14/271,258, 14/188,449, 14/188,492, 14/517,078, 14/455,630, 14/455,640, 14/482,829, 14/482,796 and 14/590,512; publication Nos. 20130091544, 20130312078, 20140245379, 20140245389, 20140245450, 20150040190, 20150046989, 20150046990, 20150074408, 20150074644 and 20150161378; all assigned to Duo Security, Inc. and all of which are incorporated herein by reference in their entireties), describes a platform for two-factor authentication via a second channel. A regular notification message is sent to the user's mobile voice device every time that an authentication is required.

There remains a need for two-factor authentication methods that require only a single action by the user under most or all circumstances. There remains also a need for two-factor authentication methods that can be automated without compromising the privacy of the user.

BRIEF DESCRIPTION OF THE INVENTION

The invention provides a method and system for accomplishing two-factor authentication for internet transactions, wherein the user of the device through which the transaction is negotiated needs to give only a single yes/no verification to the system. In some embodiments, the second factor authentication is automated without any action on the part of the user. The method calls on the user's wireless voice device for the detection of environmental wireless signals ("Short Distance Wireless Information" or "SDWI"), and uses these signals collectively as a "fingerprint" that uniquely identifies the wireless signals near the wireless voice device. (It is assumed that the wireless voice device is in the user's possession, so that uniquely identifying the wireless signals near the device constitutes authenticating the user.) The system stores these SDWI fingerprints, and later uses the stored information to establish whether or not the user's wireless voice device is near a previously-recognized SDWI. If the user has previously authorized a transaction near SDWI, subsequent transactions near the same SDWI can be authorized automatically without user intervention. A second user action, to provide the second factor of two-factor authentication, is not required, because the SDWI fingerprint is automatically acquired and processed.

A second aspect of the invention provides for the use of stored SDWI to monitor changes in the SDWI of an authorized user of a computer. The method of the invention ensures that transactions initiated by the user via the computer are authorized only for so long as the user's mobile voice device has the same or substantially the same SDWI as the computer. The uses of SDWI in the present invention resemble the uses made of geographical information in the prior art, but have significant advantages, described further below, in speed, convenience, performance, and user privacy.

DETAILED DESCRIPTION OF THE INVENTION

Figure 1:
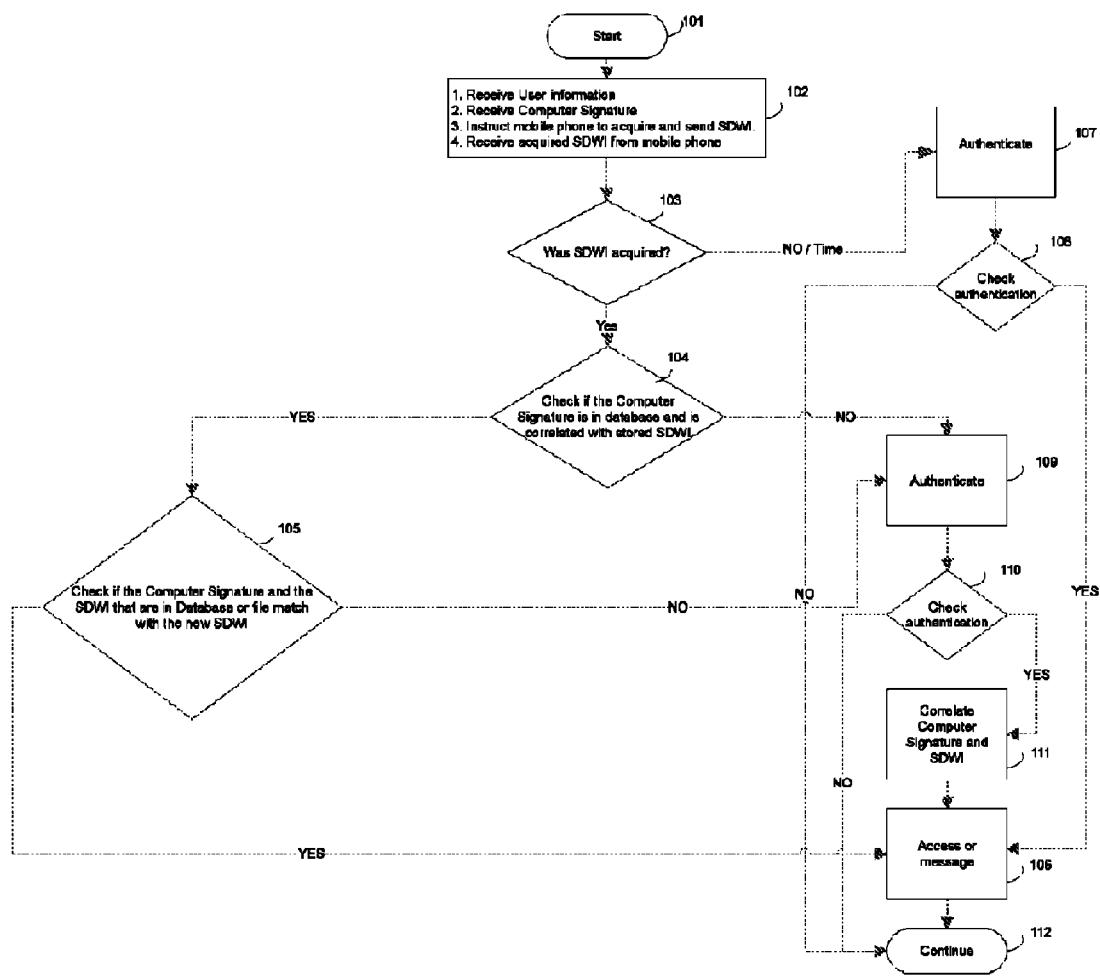
FIG. 1 is a flowchart showing the steps involved in one embodiment of the invention, for authenticating a user using SDWI.

As use herein, the term "Action" refers to an operation executed by a user with the intention of either authorizing or denying a specific transaction. Such an Action is preferably a single act by the user, including but not limited to a single click on a keyboard, a single tap on a touchscreen, shaking a cellphone, pointing a camera at the user's face, touching a fingerprint reader, or speaking a word. In general, any physical act of the user that can be detected and acted upon by a computer or mobile device may serve as an Action. The terms "click" or "tap" are used interchangeably herein to refer to pressing a physical keypad button, and also to tapping or touching a button image on a touch-sensitive screen.

The terms "User" and "Internet User" are used interchangeably to refer to the person who owns or is authorized to use a mobile voice device, whose action is required for authenticating internet transactions and point of sale ("POS") transactions. For the purposes of this disclosure, point of sale ("POS") transactions include transactions at ATM machines. The methods described herein can also be used to authenticate or authorize actions by "smart" electronic devices configured to execute predefined programmed operations upon receiving a wireless or internet command from the user. Examples of such operations by electronic devices include, but are not limited to, unlocking and/or opening a door or gate, activating a vehicle's ignition or electronic systems, switching a lamp on or off, and starting or stopping a video recording or playback device.

"Transaction information" is information and instructions that require authentication by the user before they can be acted on. Examples include but are not limited to the name of an internet server or a service, the user's username, the IP address of the user's computer, information about the browser or operating system of a computer, a product the user is interested in buying, store name, electronic device identifying information such as the name or location of a door or gate, financial account numbers, and the nature, money amount, recipient, and timing of a financial transaction.

"Authentication" or "Authorization" is a query sent to a user's mobile voice device from an Internet server in order to verify that the user approves a specific transaction associated with that user. In some contexts, the term also encompasses the user's response. The authentication or authorization can be sent to the client software using common protocols such as regular notification, SMS, phone call or IVR. IVR, or interactive voice response, is a technology that allows a computer to interact with humans through the use of voice and/or DTMF tones input via a keypad or touchscreen.

A "mobile voice device" is typically a smartphone, but tablets, laptop computers, or equivalent devices which are configured to connect to wireless carriers' cellular voice and/or data networks (e.g. GSM, TDMA, 3-G, 4-G, and the like), or WiFi or WiMax networks, may serve as "mobile voice devices" for the purposes of this disclosure. The essential features of a mobile voice device, for use in this invention, are the ability to detect and receive Short Distance Wireless Information (described in detail below) from the environment, and the ability to store and run software of the invention which acquires, processes, and transmits either the Short Distance Wireless Information itself, or an encoded summary or derivative information. In some embodiments of the invention, the transmitted information is stored and processed by a remote computer, which makes comparisons between the transmitted information and stored information, to determine if the device is at a location where transactions have previously been authorized by the user, and/or at which the user has authorized future transactions. In certain other embodiments, the mobile voice device will store SDWI or other MLI from authorized locations, will make comparisons of the currently-detected SDWI or other MLI to the stored SDWI or other MLI, and will transmit information conveying the extent to which the current SDWI or other MLI matches any of the stored SDWI or other MLI. Transmissions of the above-described SDWI- or MLI-derived information are done over the device carrier's wireless network, and although preferably pre-authorized by the user, they are accomplished without user intervention.

Mobile Location Information ("MLI") refers to short distance wireless information ("SDWI"), as defined below, Point Of Sale (POS) terminal identifiers, and mobile phone geolocation information from sources such as GPS, Wi-Fi geolocation, cell tower geo-location, or any other methods known today or in the future to identify a mobile voice device geographical location. MLI may also include environmental signatures detectable by the mobile voice device sensors, such as the user's voice (indicating the user's presence), ambient light levels (distinguishing outdoors/indoors and night/day), and patterns of acceleration (indicating that the user is walking) that can be monitored for indications of a change in location.

"SDWI" is Short Distance Wireless Information. As used herein, the term refers to information that is broadcast wirelessly for a short distance (usually under 50 m) between a mobile voice device and a second wireless device, such as a receiver, that is not operated by the mobile voice device's carrier. Such transfers of information may be initiated automatically, or triggered by the user of the mobile voice device. The information is typically transferred via a short-range wireless technology such as Bluetooth, Wi-Fi or RFID (e.g., NFC), and contains mobile location information (MLI) associated with that mobile voice device. Examples of such MLI include, but are not limited to, Wi-Fi MAC address, Wi-Fi SSID, Bluetooth MAC address, IMEI, Serial Number, and other information associated uniquely with the mobile voice device. SDWI may include the internal network IP Address as well as the external IP Address. Non-unique information broadcast from the mobile voice device may include the device's carrier, brand, model and operating system, and the SIM card's ICCID and IMSI.

In addition to information about and from the mobile voice device, SDWI may be broadcast from receiving devices, and from any number of other wireless devices within range of the mobile voice device. Such broadcast SDWI may be detected by the mobile voice device. Examples include but are not limited to MAC addresses and SSIDs of computers, printers, and routers, and router and gateway IP addresses. In particular, a mobile voice device may be connected to the Internet via a Wi-Fi enabled router, and that router will have an Internet IP address that is identifiable by the Wi-Fi connected mobile voice device. Wirelessly controlled switches, doors, and the like may also transmit MAC addresses via the ZigBee™ protocol. For the purposes of this invention, there is a preference for SDWI that has a durable association with a fixed location. To the extent that a source of SDWI is subject to change over time, it is less preferred. SDWI from nearby mobile devices, and dynamically assigned IP addresses of nearby computers, have less permanence and are less characteristic of whatever location they might occupy when detected.

As used herein, SDWI may refer to raw SDWI data, such as MAC addresses and signal strengths; formatted, encoded, and/or compressed raw data; and the results of comparing current to stored SDWI. The comparison may involve a single SDWI identifier, such as a MAC address, and checking that the current SDWI identifier matches with the stored identifier. Alternatively, the comparison may include comparing a number of individual MAC addresses and SSIDs and their associated signal strengths, and the results can also include a measure of the degree of match or mismatch. In the interest of clarity, distinctions among these meanings may be made where appropriate. Wi-Fi will be used as an exemplary source of SDWI throughout the following description, but it should be understood that the use of other short-range wireless signals such as WiMax, Bluetooth, NFC and the like are encompassed, with obvious modifications, within the discussion, and are within the scope of the invention.

A "computer signature" or unique computer ID is created by identifying certain characteristics of a computer or "smart" mobile device. These characteristics act as identifiers of a computer or mobile wireless terminal such as a PDA, mobile phone, smart phone, mobile computer, laptop, notebook computer, tablet, reader, or other such device with computing and networking capabilities. Every device that is connected to the Internet has at least one unique identifier, including but not limited to: MAC address, CPU serial number, operating system serial number, uniquely-identified vendor-installed software, and browser cookies. In addition to the above, the computer or mobile device uses network resources that have unique identifiers, including but not limited to a gateway or router MAC address and IP address, which are not necessarily unique to the computer or mobile device and may vary with time and place. Every computer or mobile device has other common identifiers, including but not limited to: operating system version and patches, hard drive maker(s), model number(s), and size(s), installed RAM and virtual memory sizes, internet browser version, installed hardware, network card speed, CPU speed, cookies, vendor- and user-installed software, and the like, many of which may also vary over time. By combining a plurality of such common identifiers, it is possible to compile a unique, or nearly unique, computer signature for any given computer. In general, a MAC address is sufficient to uniquely identify a device, and may serve, alone, as a computer signature, but it is desirable to compile a "fingerprint" of additional unique and common identifiers to make spoofing more difficult.

"User information" refers to personal identifying information, such as a cardholder's name, address, passport information, Social Security number, credit card number, phone number, and pertinent account or employee information associated with the user. This is preferably stored and transmitted in encoded or encrypted form. The user's age, gender, nickname, profession, and personal preferences such as hobbies, sports, favorite foods, product preferences, and the like may also be transmitted by certain applications running on the user's computer or mobile voice device. At least some of the personally-identifying user information is stored in a database, where it is associated with a wireless voice device of the user.

An authentication request can be a software authentication request question sent via the Internet to client software on the user's mobile voice device. The user is required to answer the question and can choose one option out of two presented, e.g., "Do you authorize the transfer of $10.00 to John Doe?" The user may be enabled to reply to the authorization request via two on-screen options presented by the client software, as shown for example in FIG. 2. The software installed on the mobile voice device is programmed to receive authentication requests from an internet server and is also designed to send the user's reply to the internet server. An authentication request can also be a request sent by SMS in order to verify the phone number. For example, an authorization sent via SMS may present a message, "Do you authorize transfer of $10.00 to John Doe? Please reply with Yes or No." If the user replies to the SMS query with "Yes", the transaction is allowed. In another embodiment, an automated IVR system calls the user, and when the user answers the call, an audible question is delivered, "Do you authorize transfer of $10.00 to John Doe? If yes please press 1, if no please press 2." An IVR system can also accept voice input, so that a spoken "Yes" results in the transaction being allowed.

Figure 2:
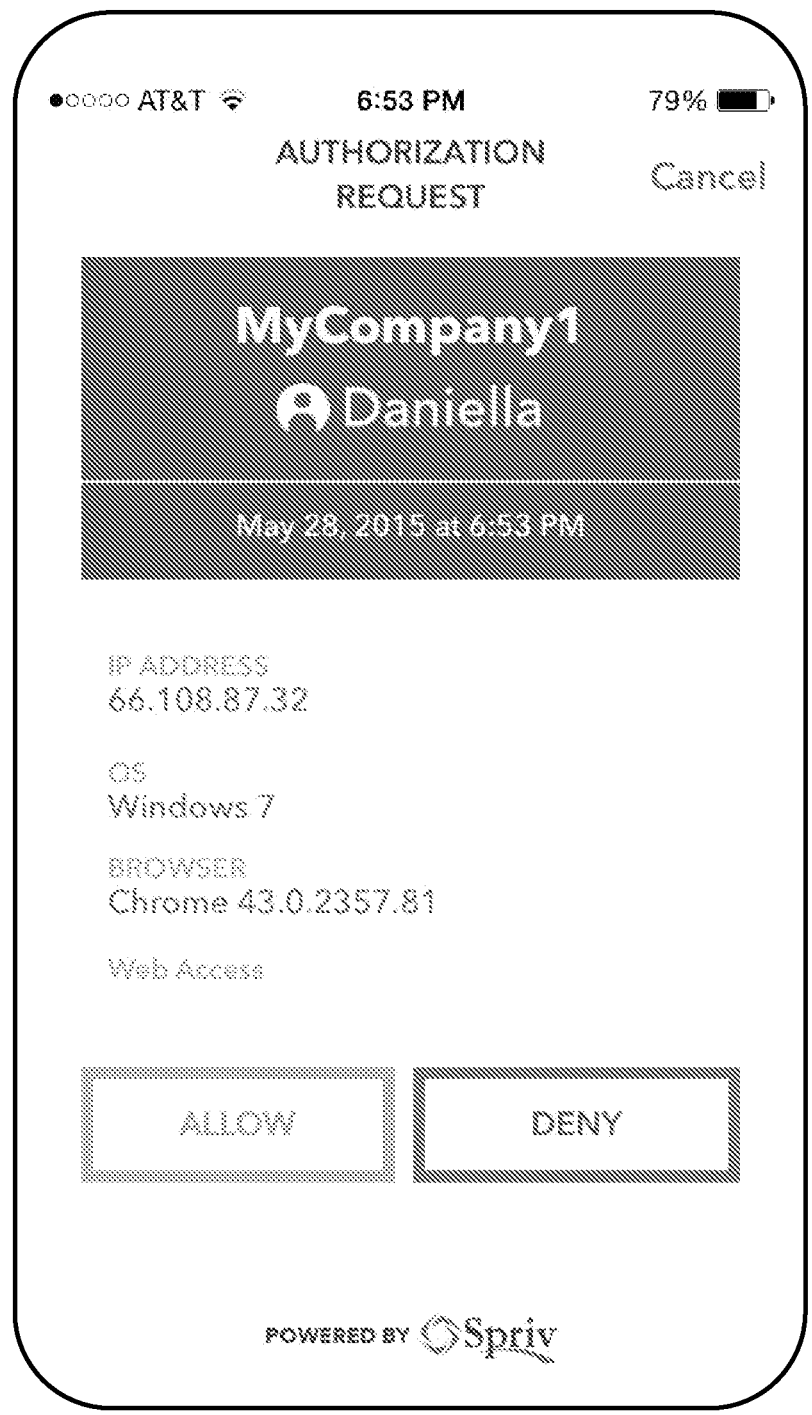
FIG. 2 is an image of a mobile phone screen presenting an authorization request.

In preferred embodiments of the present invention, the authorization or authentication request will not present an option to automate future transactions to the user; rather, the automation will take place automatically in the background if certain conditions are met. The user will have the option of disabling the automation under selected conditions. The present invention provides a means for two-component authentication wherein the user will both authorize and automate the authentication via one action, such as a single tap on a touchscreen 'Allow' button, as shown in FIG. 2.

Upon one single action by the user, this method will automatically automate transactions when a particular SDWI or other MLI identifier is in use or can be identified by the mobile voice device, while transactions in the absence of SDWI or other MLI will continue to be done manually. Wi-Fi inherently has a short radius, approximately 30 meters, making this method highly accurate. Using Wi-Fi without geographical location has additional advantages such as lower mobile phone battery consumption, no user privacy concerns because the user is not sharing his phone geographical location, and a substantial increase in the authentication speed.

In addition, this invention presents a method that automates transactions without any user intervention, as illustrated in FIG. 1. With the methods described herein, the user can use a Wi-Fi network for the first time and the transaction will be authorized using two-factor 2nd channel authentication, without any user intervention to approve the automation or confirm the second factor. Because the user does not need to interact further with the mobile phone, the method of the invention provides faster and more convenient transactions.

One advantage of using SDWI, without requesting the mobile phone geographic location, is that getting the SDWI is faster than getting GPS location information, cell tower triangulation information, or an accurate Wi-Fi geographic location. Receiving SDWI from a mobile phone may take 250 milliseconds or less, while requesting and receiving the phone's geographic location generally takes at least 1-3 sec.

Another advantage of SDWI is that the wireless information is transmitted over a short radius in three dimensions. As a result, at least within multistory buildings, height becomes a useful factor in the authentication process, whereas the geographic information obtained from geo-location via GPS or Wi-Fi is only two-dimensional. For example, if a user authorizes a transaction from the 30th floor of a tall building, the prior art methods will correlate the transaction with the geographical location on an X-Y plane, because the mapping only considers latitude and longitude. If the user travels with his wireless device to the first floor, an unauthorized person on the 30th floor, trying to carry out a transaction on the user's computer, may succeed in the attempt, because the prior art methods will still locate the wireless device (and presumptively the user) at the authorized X-Y coordinates. In contrast, when using the method of the present invention with SDWI, a user authorizing a transaction on the 30th floor is located within a roughly 60-meter diameter sphere, because the radius of Wi-Fi reception is on the order of 30 meters in all directions. (Deviations from this ideal, due to walls and floors, do not alter the principle of operation.) Subsequently, if someone is using the computer on the 30th floor while the authorized user in the first floor, the system of this invention will determine that the authorized user is within an entirely different SDWI environment, and will be able to flag and prevent the attempted transaction.

Also contributing to the greater security achieved with SDWI is the fact that the SDWI environment of a given location cannot be known without actually visiting the site and recording the information, whereas the geographical coordinates of the location are known and subject to being spoofed.

The use of SDWI also has negligible privacy concerns, when compared to geographical location sharing. There are increasingly strict international privacy laws regarding the sharing and retention of users' geographical location data, which complicate and limit the use of systems and methods that require obtaining and using geographic coordinates. Merely acquiring a user's geographical location, for example, generally requires user consent. The use of SDWI, in contrast, does not involve acquiring, sharing, or storing actual geographical location. Indeed, the methods of the present invention can operate effectively with complete indifference to the user's real-world, geographical location. Regulations requiring user consent are not applicable, making it possible to minimize the user's interactions with the device and with the system.

The use of SDWI, according to the present invention, also makes for greater convenience while a user is traveling. Prior art methods that rely on geographical location are necessarily sensitive to the user's change in location. A user who conducts transactions while connected to a mobile network (e.g., a Wi-Fi router on a bus, train, airplane, or cruise ship) will be required to interact with his device multiple times, because his geographical location is constantly changing, and it is unlikely to be the same as it was the last time the user authorized a transaction. With SDWI, in contrast, a user in transit can access his online bank account several times, without excessive interaction with the system, because the SDWI environment remains consistent. The methods and systems of the present invention permit a user to fly from Los Angeles to New York, and be required to click "allow" only once per authenticated session while connected to the airplane's Wi-Fi.

Geographical location inquiries with high accuracy require high battery consumption, while getting the SDWI has a low battery consumption. Programmers writing code for mobile devices sold by Apple Inc., for example, are specifically advised not to use high-accuracy geographical location, because of the high battery consumption, and Apple's devices automatically disable geo-location inquiries when the battery level is below 20%. Obtaining SDWI, on the other hand, requires minimal battery power, especially when acquiring Wi-Fi information from devices that the user is already connected to.

In the event that a user is in a location without Wi-Fi SDWI, such as a rural area or a building without Wi-Fi service, or if the user has turned off Wi-Fi on his device (for example, to save the battery power that would be wasted searching for non-existent Wi-Fi signals), the system and methods of the invention permit reversion to the reception of the device's geographical location, by GPS, triangulation, and/or other methods known from the prior art. Google and Apple, for example, provide an API interface for their mobile operating systems that enables acquisition of a smartphone's geographical location. Mobile phone geographical location can also be obtained from a carrier or an aggregator. With these prior-art methods of geo-location, of course, the user will have to revert to the prior art level of interaction with the device, manually confirming two-factor authorization, and manually automating further transactions from the location.

The methods and systems of the invention encompass using SDWI together with geographical location to provide enhanced security. A user wishing to spoof his location will find it difficult to mask changes in both the device's GPS coordinates and its Wi-Fi SDWI environment, or to create false data adequate to spoof both systems at the same time. A geographical comparison between a known point-of-sale (POS) and the mobile voice device geographical location (obtained from the device's GPS and/or from the carrier) can receive additional confirmation if the system of the invention is provided with SDWI information associated with the POS, which can be compared to the SDWI being reported by the device.

In certain embodiments, geo-fencing may be employed to detect that the user is approaching a specific location, even before the user makes a purchase or logs on, so that the advantages of SDWI described above can be immediately taken advantage of. The specific location being approached may be an area that the user has pre-authorized for transactions. Geo-fencing may also be employed to detect that the user remains within a specific area, such as an amusement park or shopping center, in which case the system and methods of the invention may permit all transactions within the area to be considered as pre-authorized.

For example, a user and his family may be visiting a large attraction, such as Disneyland™, where the user may purchase admission tickets, or conduct a first transaction at a POS within the park. The system and methods of the invention can be configured to interact once with a user in this environment, by approving the transaction and automatically approving all other transactions generated from the same area without requesting another authorization from the user, for as long as the user's mobile phone is within the park boundaries.

The system and methods of the invention may employ silent notifications. A silent notification is a message, command or request that is sent from the server to the client software application installed on the mobile voice device, which the software is configured to respond to without notifying the user that the notification arrived. For example, the server may send a silent notification instructing the software to acquire and/or transmit the mobile voice device geographical location, SDWI (MLI, Wi-Fi Mac addresses, Wi-Fi SSIDs, Wi-Fi signal strengths, etc.), IP addresses, the phone OS version, cell tower information, and the like, with the user of the mobile phone being unaware that the phone is being contacted by the server, acquiring the information, and providing the information to the server.

Regular notifications, in contrast, are messages, commands or requests that are sent from the server to the client software application installed on the mobile voice device, where the user does receive notification of their arrival. When the application receives a regular notification, the application is given a command from the server to present the information to the user (or is configured to do so); the user is then given the opportunity to take an action, such as authorizing a transaction. For example, the server may send a push notification to the mobile voice device, and the user will see (and possibly also feel a vibrating alert or hear an audible alert) that a message was received. The message may present to the user a query, e.g., "Do you authorize the transfer of $10.00 to John Doe? Please click 'allow' or 'deny'."

Turning to the Drawings, FIG. 1 presents an authentication platform according to the invention, that can be used to authenticate a user over the internet and/or authenticate a user at a POS, or to authorize operation of an electronic device such as the opening a door or a gate. The order of the illustrated steps may be altered to a limited extent, and additional steps may be executed, without departing from the scope of the invention.

At 101, the two-factor authentication platform has been invoked and the process starts. At 102, the system receives user information and the computer signature, and the server requests the client software on the mobile voice device to acquire the available MLI (in the embodiment shown, SDWI is acquired). This will usually take place when the user connects to a website and the website receives the computer signature, or when one website communicates the computer signature of the user to a second website where the process of the invention is being carried out. The computer signature can be the signature of the user's computer, when the user is conducting a transaction from his computer, but it may also the signature of a vendor's computer, for example when a user is buying a product at a POS in a physical store. In the latter situation, the particular sales terminal (register) at which the transaction is being carried out may be the source of the computer signature, but if the vendor has a central computer for which the terminals are clients, the central computer's signature may be employed.

The server can receive the computer signature while a user is directly connected to the server, or indirectly, for example when the user is connected to a different server and the different server is pushing the user's computer signature or the server is pulling the computer signature. It should be understood that throughout this disclosure, intermediate computers and servers, such as those employed for credit card processing, may be present between users' devices, users' computers, or vendors' computers, and the system on which the methods of the invention are actually performed.

The user information should include unique identifiers (e.g., login ID and password, phone number, and credit or debit card numbers) and may also include non-unique identifiers of the user, and of the user's device or a device associated with the user, that are relevant to the user's authority to use a gate, door, vehicle, or other device owned by the user or the user's landlord, employer, or other party having ownership or control of the device in question. The reception of unique user information, such as a user ID and password, constitute the first factor of two-factor authentication, and for this reason it should be considered mandatory if effective two-factor authentication is desired.

At 103, the system checks to see if Mobile Location Information (MLI) has been acquired. The system sends a silent notification from the server to the user's mobile voice device, which is a request to acquire SDWI. The client software installed on the mobile voice device receives the silent notification, checks if the SDWI is available, and if the SDWI is available, then the client software installed on the mobile voice device will capture the SDWI and send the acquired SDWI to the server. The client software will inform the server if SDWI is not available. In an alternative embodiment, the transmission of the SDWI can happen at step 104, after the database is checked. The SDWI should include at least one identifier of a wireless device that is independent and separate from both the mobile voice device and the second computer device, if any, that was used to initiate the transaction.

Figure 3:
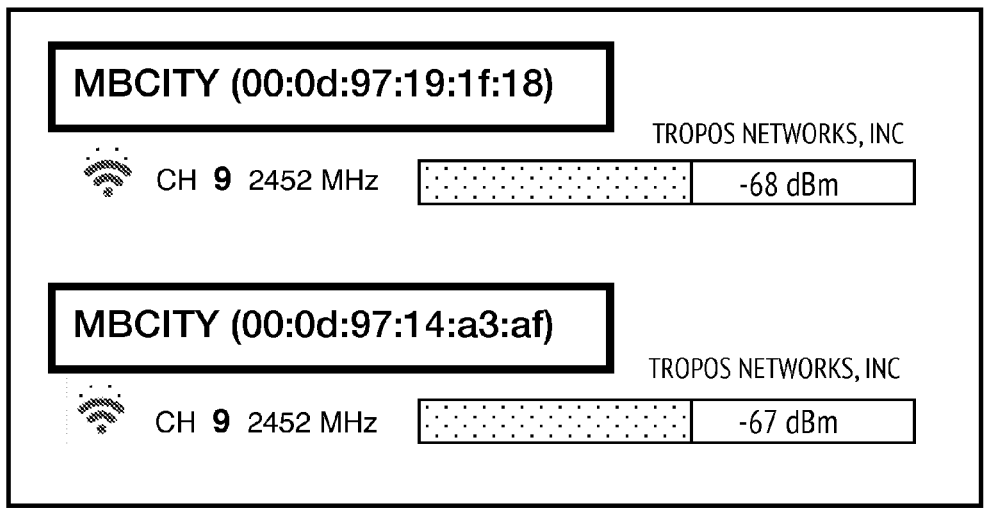
FIG. 3 illustrates detection of Wi-Fi networks having the same SSID but distinguishable by BSSID (MAC Address).

Preferred SDWI are Wi-Fi identifiers, and especially preferred are one or more of MAC address, SSID and Wi-Fi signal strength. Most preferred is the MAC address, for the reason illustrated in FIG. 3. FIG. 3 shows two Wi-Fi networks located in Miami Beach Fla., as detected by a cell phone. The two routers, which are located at different sites within the city, have been configured with the same SSID, "MBCITY". The routers are probably individual basic service sets (BSS) within the "MBCITY" extended service set. A town or city could assign a common SSID to dozens of routers, and for this reason, relying on the SSID to create a location-specific SDWI may lead to very poor precision. For optimum results, it is necessary to employ an individual router's basic service set ID, or BSSID, rather than the network SSID, as an element of precisely localized SDWI. (By convention, a router's MAC address is used as its BSSID, and the term "MAC address" will be used throughout this description.) The invention, accordingly, most preferably associates or correlates a computer signature with one or more MAC addresses. The most preferred MAC address is that being broadcast by the Wi-Fi router or Wi-Fi hotspot which the mobile device is connected to in order to access the Internet. An alternative is to combine multiple SSIDs and/or BSSIDs with their signal strengths, in order to generate a unique and highly precise SDWI.

The signal strengths shown in FIG. 3 are nearly identical, and inclusion of the signal strengths in the SDWI nominally places the cellphone along a line equidistant from the two routers. While the actual geographic location is not relevant to the invention, it will be appreciated that SDWI can be highly localized, and sensitive to changes in position.

Since SDWI does not convey or disclose actual geographic coordinates, there is no requirement for authorization by the user to acquire or transmit the SDWI, and these steps can therefore be carried out silently and without user intervention. It is important, from the regulatory point of view, and from the user privacy point of view, that the computers and servers that implement the methods of this invention, and the SDWI that is gathered from users' devices, are never correlated with geographic maps or locations, or otherwise used for geo-location purposes. For this reason, the assurance of non-association of SDWI with geographic coordinates, maps, or location names is an important aspect of those embodiments of the invention that do not also employ geo-location methods.

If the client software cannot receive a Wi-Fi identifier or other SDWI, the server gets a notification that the SDWI is not available, and the server will initiate a regular notification to the client software installed on the mobile voice, conveying an authentication request to the mobile voice device (FIG. 2), or an SMS message or recorded voice call, at 107. In preferred embodiments, in order to limit the necessary user action to a single click, the authentication is conducted without presenting to the user an option to automate future transactions. Authentication at 108 via the requested user interaction (FIG. 2), or by other prior art methods, may then be carried out. The authentication request contains information identifying the transaction that was initiated by the user, and requires user intervention. Such a regular notification is contingent upon receiving information at 103 indicating that SDWI information is not available.

At the same time that SDWI information is being checked at 103, other MLI such as GPS geographical location, Wi-Fi geographical location, or carrier-provided geolocation information, can also be sought, and acquired if available, for optional use at 108. If no MLI of any kind is available, the client software will reply back to the server with a message that MLI is not available, and the system will fall back at 108 to direct user interaction (FIG. 2) for ordinary two-factor authentication. The step of getting the SDWI or other MLI can be done without the user's intervention when the user has logged in to a service from a second device (e.g. a desktop computer.) While the user is waiting for the authentication to complete, the authentication steps are being done silently in the background, via the mobile voice device, without any user intervention.

Installation of client software on the mobile voice device that enables it to reply to the server and inform the server that MLI is not available is a crucial element, because the server can then send a regular notification in step 107 with authentication request (FIG. 2), or initiate an SMS message or a phone call to the internet user's mobile voice device, enabling user intervention when it is needed. Furthermore, the system can check that a reply is received from the client software within a predefined time period (e.g., six seconds), and if a reply is not received within the predefined time then proceed to step 107 with an authentication request. In the absence of these features, the user might continue to wait indefinitely without any response from the system. If Wi-Fi is disabled on the mobile voice device, or if there are no usable Wi-Fi signals within range, it is essential to inform the server that SDWI is not available, so that the server can send a regular notification to the user's mobile voice device, have the client software present a message to the user, and request the user's authorization as in FIG. 2, or, optionally, fall back on prior-art geo-location methods.

At 104, the system checks to see if the computer signature is saved in a database or file, and if the computer signature is correlated with stored SDWI.

At 105, the system compares the SDWI and computer signature with the SDWI newly acquired at 103. If the computer signature and SDWI are already correlated in the database, the system proceeds to 106, where access is granted or a transaction is approved. It is also a feature of the present invention that, where the user has approved the transaction, the acquired SDWI is by default correlated (associated) with the computer signature (step 111), and all future transactions that have the same, or substantially the same, SDWI and the same computer signature will be automatically authorized (i.e., the provision of the second factor of two-factor authentication will be automated via a "yes" decision) once the user has authorized an initial transaction at steps 109-110.

At step 106 the system will permit or authorize the initially-requested transaction. The system may, for example, allow access to a web site, allow a payment for goods or services, open or unlock a door or a gate, or communicate to another system or service that such a transaction has been approved. Such communication may convey a message that the transaction is authenticated, approved, or allowed, or otherwise indicate that the authentication of the user was successfully completed; the message may also provide a positive score for evaluation by the receiving system or service. The system may also dispatch a message to the user, informing him or her that the authentication was completed successfully and that the transaction was approved.

If, at step 103, the mobile voice device reports that SDWI or other forms of MLI are not available, the method proceeds to step 107, where a regular notification such as an authentication request is sent to the user. Step 107 can also be triggered by the passage of a pre-set period of time, from the initial request for SDWI availability, in which there has been no reply back from the mobile voice device. The server may in this situation initiate a second notification to the mobile voice device in the form of a regular (i.e., not silent) notification, requesting the user's action to authenticate or authorize the transaction. The authentication or authorization request does not provide an option to the user to automate future transactions, because the system of the invention does that by default. (See FIG. 2) The regular notification may include information about the transaction, including but not limited to date, time, IP Address, username, identifying information for the device where the transaction originated, such as OS and browser, and Point Of Sale data such as the store name and location, the product or service being purchased, the dollar amount, and the account(s) sought to be accessed. If the transaction is an attempt to activate a device, such as a switch, door, or lock, the identity of the device can be displayed. Alternatively, the authentication query can be delivered via SMS, phone or IVR.

The server receives the response from the user, via the client software installed on the mobile voice device, at step 108, and checks whether the user allowed or denied the transaction. Alternatively, the server may receive the user's decision via SMS, phone or IVR. The system proceeds to step 106, described above, only if the user authorizes the transaction, thereby providing the second factor of two-factor authentication.

If, at step 104, the system determines that the computer signature is not in the database, or that the signature is in the database but has no SDWI correlated with it, the method proceeds to step 109, where the same processes described above for step 107 are executed.

At step 110, the server receives the response from the user, via the client software installed on the mobile voice device, and checks whether the user allowed or denied the transaction. The server may, alternatively, receive the user's decision via SMS, phone or IVR. The system proceeds to step 111, described below, only if the user authorizes the transaction, thereby providing the second factor of two-factor authentication.

At step 111, because the user has chosen to approve the transaction, the system saves any new computer signature in the database, and saves the SDWI in association with the computer signature. The correlation between the computer signature and the SDWI is thus established and saved to the system by one single click by the user.

If a higher level of security is desired, it is possible to automate only those transactions that are done using a secured network (i.e., a router protected by a password and using encrypted communications (e.g. WEP, WPA, or WPA2.) For example, if in a current transaction the current MAC address of the router being used by the computer is secured, and the database has an association of that MAC address with the computer signature from a previous transaction that was also secured, the current authorization can be automated.

Alternatively and optionally, the system can present an option to the user to delete from the database the correlation of the computer signature with SDWI associated with the location, or with specific Wi-Fi information that is part of the SDWI. For example, if the user is in a restaurant named "Ali Baba" and is connected to the Internet via the restaurant's Wi-Fi router, and the user clicks 'allow' to authorize a transaction, the router's Wi-Fi SSID (e.g., "Ali Baba Restaurant") and MAC address will by default be associated at step 111 with the computer signature (which likely to be the signature of the user's cell phone, laptop, or tablet.) In the future, at step 105, the system will automatically authorize transactions initiated at the restaurant and associated with the same computer signature. The client software, however, can present an option to the user to remove the SSID "Ali Baba Restaurant" (and the corresponding MAC address) from the automated access locations. The user may wish to do so if, for example, he does not expect to dine at the restaurant in the future. Also, the user may not want multiple types of transaction automated, merely on the basis of their all being initiated at a favorite restaurant. The user may be given the option to block automation of future transaction at 110, in which case any associations between the SSID (and MAC address) and the computer signature will be removed from the database. The SDWI acquired at the restaurant may simply be deleted, or it may be stored for future reference without the correlation that would trigger automated authentication. Additionally, the user may be given the option, in the client software, to revoke future automated access by deleting the association(s) of SDWI with computer signatures. In either case, the next time the user initiates a transaction via the Wi-Fi SSID "Ali Baba Restaurant", a "Block" decision will require the user to interact again with an authentication query (step 109) and provide his decision to allow or deny the transaction.

At step 112, the method of the invention terminates, and the system continues according to external programming.

A second aspect of the invention enables the use of SDWI to establish that a user conducting automatically-authorized transactions at a computer remains at that computer, providing assurance that automated authentication will not be provided to an unauthorized user of the computer when the authorized user is absent. Today's two-factor authentication methods authenticate a user when the user logs in to a system, in other words, they authenticate the user at the point of entry, or at the time a transaction or action is initiated by the user. Once the user is authenticated, his authorization to conduct transactions generally lasts for as long as he remains logged on, i.e., he is working within an authorized session. The prior art two-factor authentication methods do not send an alert or indication that the user has stepped away from the computer.

Since current authentication methods do not send an alert when the user steps away from the computer, it is possible that a user, after having been successfully authenticated via two-factor authentication, will step away from his computer for a coffee or lunch break. If the user fails to put the computer into a standby or sleep mode that requires a password for re-activation, an unauthorized user could take control of the authenticated session before any time-out routine can intervene and force a logout. Neither the party operating the server, nor the absent authorized user, would be aware that an unauthorized user has taken control of the authorized session.

Therefore it is highly important, once a user has been successfully authenticated and has established an open and authorized session with a server, to have a method of detecting when the user is no longer near the computer.

The method described here authenticates the user at the point of entry and, unlike other two-factor authentication methods, has a continuous authentication mechanism that will alert the server if the user steps away from the computer. If the user steps away, the server may initiate an alert to inform the user, and/or close the current authorized session.

It is desirable that such a system will be triggered only when the user moves more than a certain distance from the computer. Tracking the user's movement per se (e.g. the number of steps, which can be tracked via a cell phone's accelerometer), timing inactive periods within the authenticated session, or timing keyboard or mouse inactivity, can cause false alerts if the user is merely walking around the room, and/or attending to other tasks, while remaining close to the computer. Most computer users are familiar with the annoyance of being logged out of an authenticated session due to "inactivity", as a result of taking a telephone call or attending to other tasks—even while seated at the same computer. Such logouts are unnecessary, do not contribute to security, and consume user's time as they log in again and resume the session, often needing to re-enter data that had been previously entered but not saved.

Figure 4:
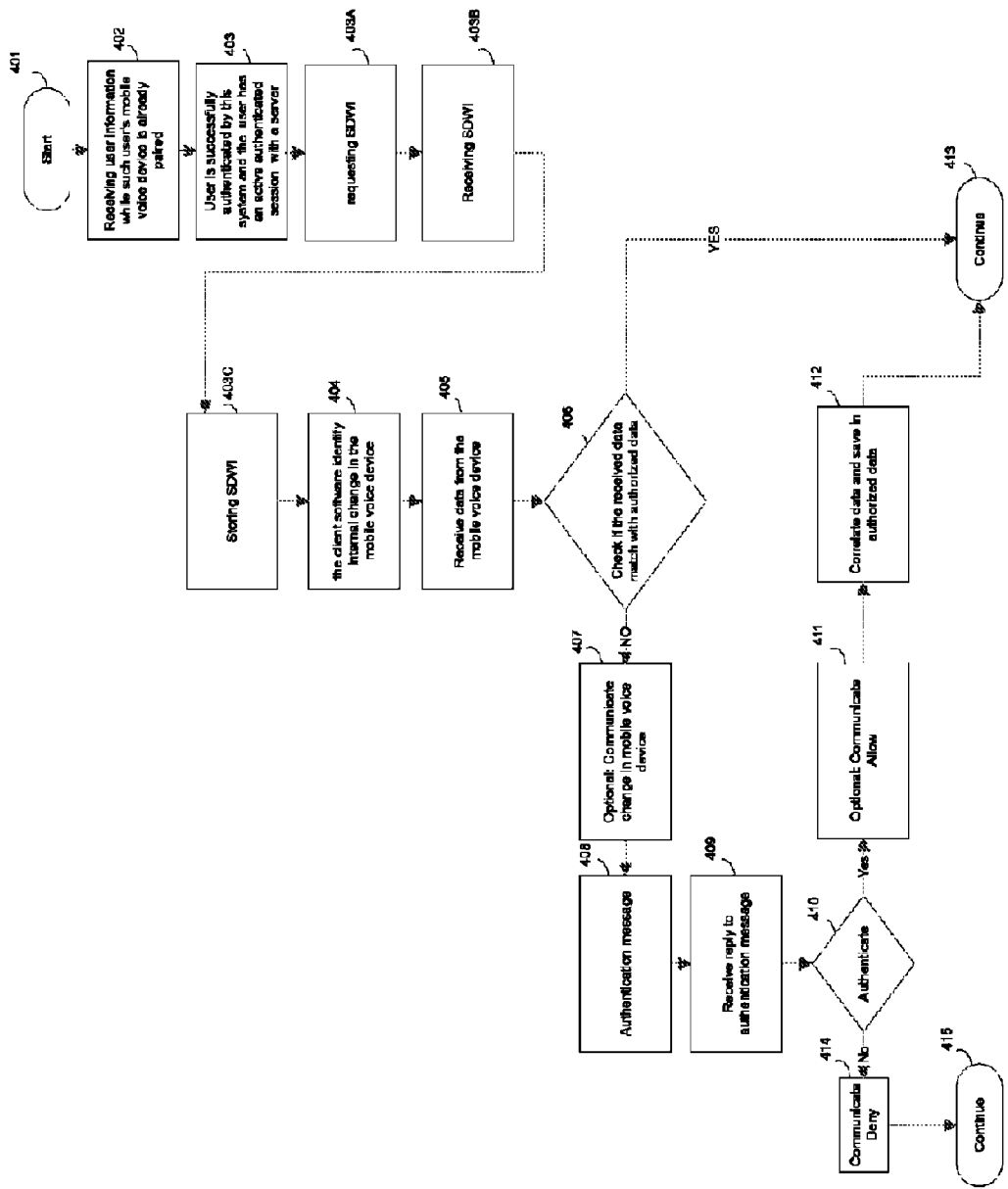
FIG. 4 is a flowchart showing the use of SDWI to monitor the location of a user relative to a computer from which the user's transactions have been authorized.

The present invention provides a system for monitoring a user for movement, for determining the net movement of the user relative to a computer, and for reliably regulating the user's authorized secure sessions on the computer according to his movements, while avoiding unnecessary logouts and timeouts. A representative embodiment is shown in FIG. 4. The order of the illustrated steps may be altered to a limited extent, and additional steps may be executed, without departing from the scope of the invention.

Turning to FIG. 4, the process of the invention begins at 401, when a user initiates a session with a server from a computer. In certain alternative embodiments, the user will be authenticated and have initiated a secure, authorized session with the server before the method proceeds to 402. At 402, the system receives initial information via one or more of the computer, the user's mobile voice device, or a second server. The second server may be a server that is owned by the party that is operating this system, or by a third party that is in communication with the user.

The initial information may include, but is not limited to, the computer signature, user information, and/or the user's mobile voice device information. The initial information identifies the user and/or the devices that are being used by the user. The computer's signature has been defined above. Examples of user information include one or more of the user's username, password, phone number, credit and debit card numbers, customer numbers, account numbers, and email addresses, as well as any biometric user information which may be available to the computer or the mobile voice device, such as fingerprints, heart (ECG) information, iris and retinal scans, and voice- and face-recognition patterns. Examples of suitable mobile voice device information include one or more of SDWI, MLI, geographical location, and IP address.

When the server has received sufficient user information to identify the user, the server will identify and contact the user's mobile voice device, which has previously been paired with the user information in a table or database.

If the user has not yet been authenticated, at 403 the user is authenticated by the methods described elsewhere herein, or by any other method known to be suitable for one- or two-factor authentication of a user to a server. Where the user has negotiated only a single factor authentication, such as a username and password, the second factor in a two-factor authentication may be provided to the server at 403. The second factor authentication can be a manual authentication, where the user has to take an action with his mobile voice device in order to authenticate, or it may be an automatic two-factor authentication, where the two-factor authentication happens automatically without any user intervention with the mobile voice device. At the conclusion of 403 the user has an active, authenticated session in progress, and the system has established communication with, and activated, client software installed on the user's paired mobile voice device.

At 403A, the system requests SDWI from the mobile voice device. The mobile voice device, via the client software, may acquire any available SDWI from the environment, or alternatively only the specific SDWI components that the server has requested.

At 403B, the server receives the requested SDWI from the mobile voice device. In the absence of SDWI, the system may be configured to reply back to the server that SDWI is not available.

At 403C, the received SDWI is stored in a database or file in association with the computer signature, as "authorized data." This SDWI is presumed to be the SDWI at the location of the computer, because it is acquired immediately after the user initiates an authenticated session on that computer.

At 404, client software installed on the mobile voice device monitors the mobile voice device for changes in the Wi-Fi environment. Such changes include:
1. The mobile voice device's Wi-Fi is switched off by the user.
2. The Wi-Fi station that the mobile voice device was connected to is no longer connected, or is no longer connected to the network.
3. The Wi-Fi station that the mobile voice device was connected to is no longer connected, and the mobile voice device is now connected to a different Wi-Fi station.
4. Signals from Wi-Fi devices other than those described above appear, disappear, or exhibit significant changes in signal strength. A significant change might be a 30%, 50%, or 80% decrease in signal strength, depending on the desired sensitivity to movement.

Sensitivity to movement can be selected by a system administrator in a control panel. The system administrator can determine what an acceptable matching percentage is when several SDWI components are compared, for example when capturing multiple MAC addresses, SSIDs and signal levels, and comparing them with stored MAC addresses, BSSIDs and signal levels, or with the MAC address, BSSIDs and signal levels reported by another device. A suitable level might be as little as 50%, although 75%, 85% or even 95% might be desired. Some specific types of SDWI are more valuable than others in this context, and any formula combining them would preferably weight the more valuable elements more heavily. Thus, the MAC address of the router being used to access the Internet would be very heavily weighted if it were available wirelessly, as it may be if file sharing is activated. Other highly weighted elements would be the computer's IP address, and if the user's computer and wireless voice device are both connected to the same router, that router's MAC address and IP address would be weighted heavily as well.

The client software can also monitor an accelerometer, if the mobile voice device is equipped with one, for evidence of changes in the user's location. The accelerometer is used to count steps taken by the user. A change in location is identified only if the result of the steps taken was a net movement in one direction. If the net movement is zero, i.e., the user has walked a full circuit on a closed path, the motion will not be identified as a change in location. The software may optionally factor in a specified period of time before identifying a movement as a change in location, effectively waiting to see whether the user is moving in a circle or is in fact departing to another location.

If a net movement of the user, and/or a change in the Wi-Fi environment, is detected by the client software at 404, the system proceeds to 405, where the server receives information about the movement or change in Wi-Fi environment, from the mobile voice device. The information may include, among other things, the number of steps taken by the user since the user was authenticated, computer signature, SDWI, IP address, or other MLI. In some embodiments, geographical location may be communicated as well. This information is sent to the server during the active authenticated session between the user's computer device and the server.

At 406, the system checks whether or not the data received at 405 has pre-authorized values. Authorized values for the data ("authorized data") refers to information received from the user and/or from other users, which has been correlated with the computer signature and saved in a database or a file in the mobile voice device or on a remote server. Authorized data is data that is known to be characteristic of the local environment surrounding the computer. A non-limiting example of authorized data is an IP address or a Wi-Fi MAC address of a device (other than the mobile voice device) located acceptably close to, and preferably in the same room as, the computer whose signature is correlated with the authorized data. Routers, wireless printers, and other computers are typical examples of such devices.

If the received data matches with authorized data, the mobile voice device is deemed to be in the vicinity of the computer, and the user is assumed to be there as well. The method proceeds to 413 and continues with other programmed tasks. A common programmed task at 413 will be a return to step 404, to continue monitoring the user's mobile voice device movement, for the duration of the authorized session.

If the received data does not match with authorized data, the method may proceed through optional step 407, or may in alternative embodiments proceed directly to step 408. At 407, the system has the option of communicating that a change in the mobile voice device environment was detected. Such communication can be effected by one or more of the following:

1. Sending a message to another server
   a. Where the other server is owned or operated by a party that is different from the party operating this platform, or
   b. Where the server is owned or operated by the same party operating this platform.
   The other server may or may not terminate the authorized session.
2. Initiating a message to the user. The message can be presented on the user's computer device or mobile voice device.
3. Initiating a message to the mobile voice device that is being used by the user for the transaction/action.

Messages sent to mobile voice devices can be sent via the Internet to the client software installed on the mobile voice device, or via voice, IVR, or SMS messages sent via the carrier network.

A single office, home, store, public area, or private area may have more than one Wi-Fi router (As used herein, "Wi-Fi router" refers to any Wi-Fi communication device that allows users to connect to the internet wirelessly. The term is meant to include Wi-Fi hotspots, Wi-Fi extenders, Wi-Fi boosters and Wi-Fi networks in general.) In an apartment building, for example, one floor may have one Wi-Fi router while the second floor may have a second Wi-Fi router. The system may identify that the user has moved from near one Wi-Fi on the first floor to near the other Wi-Fi router on the second floor during the authenticated session. The system will detect this move by noting the change in Wi-Fi environment, as described above, if the user's mobile voice device switched connections from one router to the other. If both Wi-Fi router MAC addresses are among the "authorized data", then the system will not send an authentication request because both Wi-Fi routers are authorized. If the second router's MAC address is not among the "authorized data", this will trigger steps 407 and 408 and may require user intervention in order to authenticate the transaction.

Alternatively, if the user moves from one Wi-Fi router, which is part of the authorized data, to a second Wi-Fi router which is not part of the authorized data, the second Wi-Fi router can be automatically authenticated without user intervention if the IP address of the second Wi-Fi router used by the user's computer device matches the IP address of the mobile voice device, i.e., if both devices are using the same router.

At 408, an authentication message will be sent to the user's paired mobile voice device, where the user can provide his decision on whether to authorize continued operation of his open, authenticated session on the computer. This may take the form of an authentication query sent to client software installed on the paired mobile voice device, as shown in FIG. 2 and described above. Alternatively, the message can be a voice, IVR, or SMS message initiated by the server and sent to the paired mobile voice device. The message to the paired mobile voice device can also be sent by a third-party vendor service, and may include a verification code, preferably a dynamically generated passcode. SMS messages sent to the mobile voice device from a third-party vendor may be sent from a service that has more than two originating phone numbers.

The client software installed on the mobile voice device may be configured with an internal decision trigger that enables the software to automatically initiate an authentication query. This may be trigged by one or more events such as the mobile voice device's Wi-Fi being switched off, a loss of Wi-Fi reception or connection, geo-location being disabled, a failure to connect to the Wi-Fi network within a pre-set time period, the mobile voice device moving into or out of a geofence, a change in IP address, a particular movement pattern from an accelerometer, or particular sounds.

At 409 the server receives the user's reply to the authentication message. The authentication reply may be sent to the server via the Internet by the paired mobile voice device client software, and may include a verification code such that described for step 408 of FIG. 1. Alternatively, the user may reply to an SMS authentication message via an SMS reply from the paired mobile voice device. The SMS platform has the ability to confirm that the phone number that the user sent the SMS message from corresponds to the paired mobile device. Another alternative employs the client software installed on the paired mobile voice device to receive and convey the user's reply to the authentication message.

At 410 the received reply is evaluated and acted on. If the authentication message is sent to the server via the Internet, the system checks whether any code received at 409 matches with a code sent to the user in step 408. If they match, then the user is authenticated, and the system proceeds to 411.

If, at 409, the platform received an indication that the user replied to an SMS message sent to the user at 408, the SMS platform captures the phone number that the user sends the SMS from. The system determines whether the phone number the user replied from is the same phone number the SMS was sent to, and if so, then the message and the user may be authenticated. In preferred embodiments, the SMS platform also captures the phone number that the user replied to, and the system determines whether the phone number that the user replied to is the same phone number that the SMS was sent from; these numbers must also be matched before the user is authenticated.

If the user is authenticated at 410, the method proceeds to step 411, otherwise the method proceeds to step 412, further communication is denied, and the method continues at 415 with further programming (e.g., terminating the call and/or generating a security alert.)

As an optional step, in certain embodiments an additional step to authenticate the user may be executed, in which the user is authenticated by recognition of his fingerprint, face, or voice, via the wireless voice device.

At 411, the system queries the user, via the wireless voice device, whether or not the authorized session should be kept open. If the user replies in the affirmative, the method proceeds to 412, where the system will correlate the SDWI received at step 405 with the user information received at step 402 and save the correlated information in a database or table as authorized data. Authorized data may take the form of a database or a flat file, and can be saved on a remote server and/or locally on the mobile voice device.

At 413, the process continues with other programmed tasks. The process may resume at step 404 if the paired device again detects a change in environment and contacts the server accordingly.

At 414, the server may communicate a deny message to a second web service operated or owned by the same party or a different party. This can be effected by connecting to the second web service over the Internet and transferring the message to the second web service, or by having the second web service connect over the Internet to the server and request the message.

At a router's MAC address and IP address, the process continues with other programmed tasks. The process may resume at step 404 if the paired device again detects a change in environment and contacts the server accordingly.

One aspect of the invention is a method for two-factor two-channel authentication of a user without user intervention, which will be described in detail below.

Figure 5:
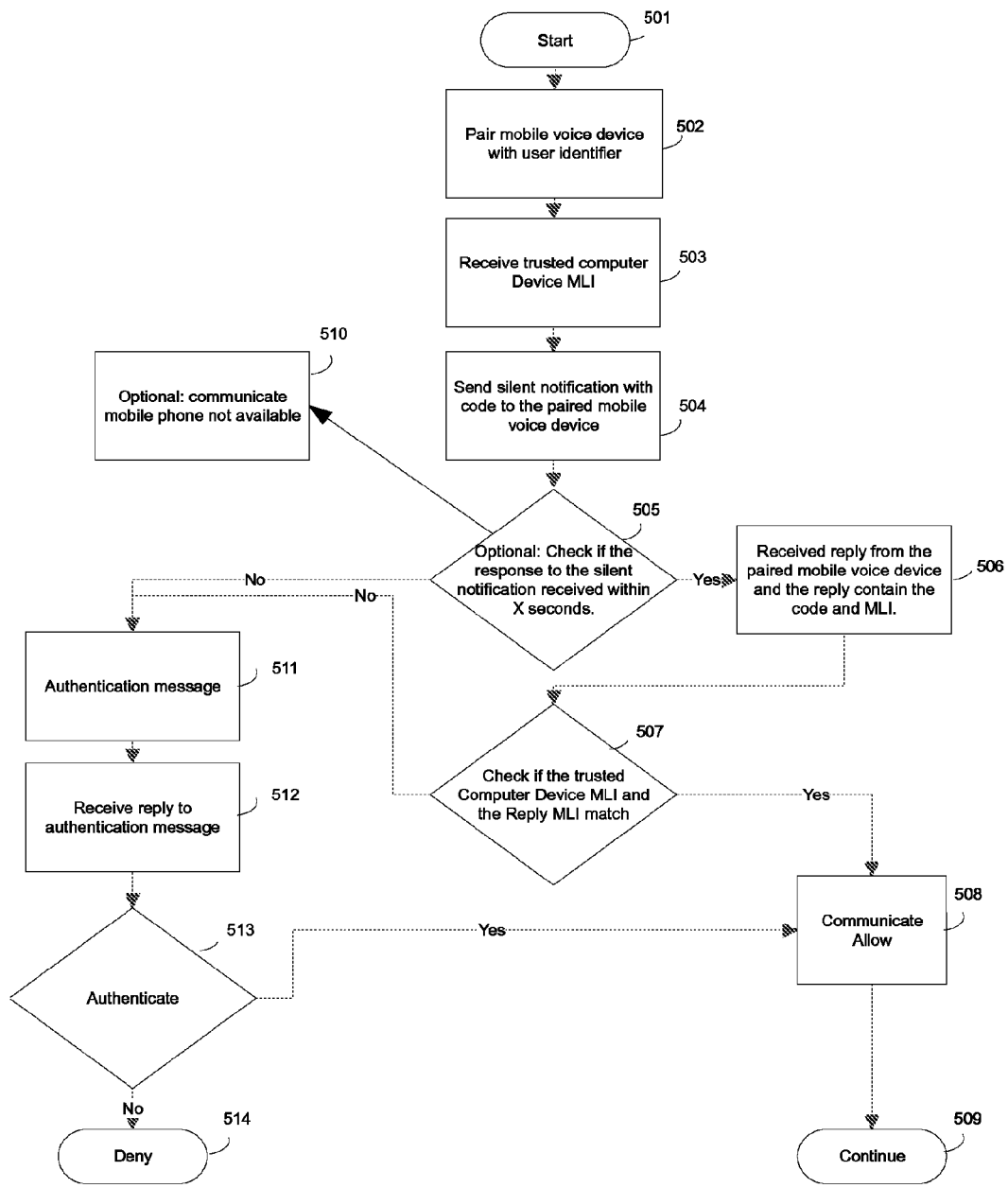
FIG. 5 is a flow chart showing two factor authentication using with no user intervention.

Turning to FIG. 5, the process starts at 501 when a user initiates a session from a computer or similarly networked device.

At 502, the user's mobile voice device is paired, using a user identifier such as a username, email address, credit or debit card number, identification number, serial number, phone number, or other unique or common names or numbers. The pairing can take place by requesting two separate pieces of information or, alternatively, via two separate channels, or by requesting two separate pieces of information via two separate channels.

For example, a first channel may be used by the user to communicate with a website or server, such as when logging into an online bank account from a computer. A second channel may be accessed through the user's mobile voice device; if the user receives an SMS message, for example, SMS is the second channel.

The server may provide to the user a first separate piece of information, such as an alphanumeric code or a link to a web site. The second separate piece of information may be the username-password combination, in principle known only to the user, provided in conjunction with the code or link over the same channel. Alternatively, the user may provide his username/password via the computer, as a first piece of information over a first channel, and the last 4 digits of a credit or debit card via a mobile voice device, which is a second piece of information provided over a second channel. In either case, both pieces of information are sent to a server, and the server may pair the mobile phone with the user's identifier if both pieces of information possess the expected values.

The server can provide separate information at the same time that the user information is being provided. For example, the user may be using the computer via the Internet while the pairing takes place via SMS to the user's mobile voice device. The Internet is a first channel while the SMS is a second channel. In addition to using two separate devices with two separate channels, as described above, the computer and the mobile voice device can be the same device using two separate channels. Pairing is preferably done by conveying two pieces of information to the server through two different channels. In general, the known methods for authenticated pairing are suitable for use in step 502, as is the novel, alternative method for safe pairing described elsewhere in this application Once the mobile voice device is paired, the method proceeds to 503, where trusted computer MLI is received by the server. "Trusted computer MLI" is information that has been verified or authenticated in the past by a different user, independent of the user being authenticated by the current process. The trusted computer MLI is received via a mobile voice device that is correlated with identifier(s) of a first user (user A) in order to authenticate a transaction by user A. The information received from user A's mobile voice device is authenticated and, once approved by user A, the information is correlated and saved in a database or file. A second, independent user (user B), whose mobile voice device is likewise independent from user A's mobile voice device, requires authentication in order to make a transaction that may be entirely independent from the prior transaction of user A. The method of the invention provides for B to be authenticated automatically, using the same correlated information that was used to authenticate user A. Correlated information includes but is not limited to Wi-Fi MAC addresses and Wi-Fi IP addresses, the computer signature, user information, network information, or environmental information such as SDWI.

Another source of trusted information could be a system administrator, who provides data that can be trusted, such as a particular MLI. Suitable MLI includes but is not limited to IP addresses, MAC addresses, NFC identifiers, infrared identifiers, geographical location, and Wi-Fi MAC address. Upon approval of an authenticated transaction by one user, each piece of MLI can be correlated or associated with that particular user's identifier(s). For example, a Wi-Fi IP address and a Wi-Fi MAC address may be correlated with a first user. Such correlated MLI can be then used with a second user who is independent from the first user, and a second mobile voice device that is separate and independent from the first mobile voice device that originally captured the MLI information.

Several methods can be used to acquire trusted computer MLI:

(1) Vendor-provided computer MLI. A vendor may provide a list of computer MLI, such as IP addresses, NFC and infrared identifiers, geographical locations, and Wi-Fi SSIDs and MAC addresses.

(2) Server identification of computer information. When a user is connected to a server via an IP address, the IP address may be used as the computer MLI. By way of example, when user A uses computer A to connect to a server via IP address A, the server may also receive the mobile voice device IP address without any user intervention with the mobile voice device. The server compares computer IP address A to the mobile voice device IP address, and if both the computer and the mobile voice device are using the same router, the server finds that the IP addresses match. The server can then communicate the command to allow access.

(3) The trusted computer MLI can be provided by the system administrator, a second user, or multiple users, where the second user is not a system administrator and does not have security or system configuration privileges. The second user can be an employee with regular access privileges, or an Internet user who, other than using the same service, is not associated with the user that is being authenticated. The first and the second users use two separate mobile voice devices.

The system administrator may choose to automatically allow users that access a website from a particular area such as an office, home, or geographical location. The SA may provide one set of data or combination of data, including but not limited to MLI such as IP addresses, or Wi-Fi information such as MAC addresses, and geographical locations such as a physical addresses. Alternatively, the practitioner of this method may choose to trust data if the data was previously authenticated by a different user. For example:

(a) User A uses a computer to access a specific network that has a specific MLI in office A, where the computer and the network have the same MLI, such as an IP address, Wi-Fi or router MAC address, or a combination of two or more MLI.

(b) The platform authenticates user A via second-factor authentication and saves the MLI information in a 'trusted device MLI'. The 'Trusted device MLI' will be saved on a file or in a database on a remote server and/or on the user's mobile voice device. Such correlated information can be the MAC address A and IP address A. (Trusted Device MLI is correlated information that is trusted by the system because the information has already been authenticated)

(c) User B is in the same office A, using the same computer, and has the same network IP and MAC address as user A. In this case the platform identifies that the combination of IP and MAC address for user B is already authenticated by user A, so that user B can be automatically authenticated in the background without the need to send a regular notification to user B or without any user B intervention with his mobile voice device.

As another example:

(a) User A uses computer A with IP Address A. The user's mobile voice device A receives MAC address A from the same Wi-Fi network used by the user to access the Internet.

(b) The system authenticates user A, correlates the data with user A's identifier(s), and saves the information in a 'trusted device MLI'. The 'Trusted device MLI' will be saved on a file or in a database on a remote server and/or on the user's mobile voice device. Such correlated information can be the MAC address A and IP address A. (Trusted Device MLI is correlated information that is trusted by the system because the information has already been authenticated)

(c) User B is using computer B with IP address A, and his mobile voice device receives MAC address A from the Wi-Fi network.

(d) The server receives IP address A and MAC address A from user B's mobile voice device via silent notification, without sending a regular notification or requesting any user intervention from user B.

(e) The transaction can be automatically authenticated because IP address A and MAC address A match with the trusted information saved in trusted device MLI.

Having received the trusted computer device MLLI, the method moves to step 504, where a silent notification with code is sent to the paired mobile voice device. The user is not aware of when the mobile voice device receives such silent notification. The code can be a unique alphanumeric code comprised of numbers (e.g. "18492374"), letters (e.g. "TYF-GKBCS") and symbols (e.g. ":)!#(&^"), or a combination thereof.

The system may proceed to Step 505, which is optional. If 505 is not carried out, the system proceeds immediately to 506. At 505 the system checks whether the response to the silent notification is received within a pre-selected time frame, represented in FIG. 5 as "X seconds". If the paired mobile voice device replies to the silent notification within X seconds, the method proceeds to step 506. If the server does not receive the reply to the silent notification within X seconds, they system may go to 510, where the server may issue a message regarding the non-availability of the mobile voice device, or alternatively go to 511.

Some operating systems, such as Apple™ iOS, may choose not to deliver a silent notification to a paired mobile voice device under certain conditions, such as a low battery, or an excessive number of silent notifications already having been sent to the paired mobile voice device. In such cases, the server may not get a reply to the silent notification. In order to avoid long wait times by the user, the server can trigger a regular notification to the user (at 510) after X seconds, and proceed to 511.

At 506, a reply is received from the paired mobile voice device, which contains the code sent via silent notification at 504. The reply also contains MLI such as Wi-Fi MAC address, IP address, geographical location, etc. If the mobile voice device is connected to the Internet via Wi-Fi, then the Wi-Fi external IP address will be used for sending the reply to the server via the Internet, and the reply will also contain the WiFi external IP address.

Moving on to 506, the trusted computer information received at 503 and the MLI received at 506 are compared to see whether they match. The comparison can be a geographical comparison for proximity, or a calculated degree or percentage of matching. If the computer information and the MLI match, or if the match is acceptably close, the system proceeds to 508. If they do not match, the system proceeds to 511.

At 508 the server may send a message to another server indicating that the user is authenticated, the information matches, and/or the transaction is verified. Or the server may allow access by the user to a particular site or service, or allow activation or operation of an electronic device such as a lock or gate. At this point second-factor authentication has been completed successfully, and the server may communicate a message or other indication of success to inform another server that the user completed the authentication successfully.

At 509, the system may terminate the method, and proceed with other programmed processes until the method is invoked again at 501.

Step 610 represents an option to communicate to another device that there has been no communication with the mobile voice device: the device is not available, or no reply has been received. This communication can be directly with the user via the Internet, or alternatively communication with another server indicating to the other server that the communication with the user's mobile voice device is not available, or that there is no reply from the mobile voice device at the moment. A message to the user's mobile voice device through another channel, such as voice, can also be sent.

At 511, an authentication message is sent to the user's mobile voice device, where the user must provide a decision whether to authorize or not authorize the transaction. An authentication message can be a message displayed by client software installed on the mobile voice device, as shown in the example of FIG. 2. Alternatively, the authentication message can be an SMS message initiated by the server and sent to the mobile voice device. Such a message can appear by:

1. Initiating a regular notification from the server to the client software installed on the paired mobile voice device. The message to the paired mobile voice device can be sent by a third party vendor service such as Amazon™. The regular notification sent to the user may include a code.

2. Initiating an SMS message to be sent to the mobile voice device. The authentication message can be an SMS message sent to the mobile voice device from a third party vendor, preferably from a service that has more than two phone numbers to send SMS messages from.

3. An internal decision trigger within the client software installed on the mobile voice device. Such client software can initiate the authentication message automatically. For example, if Wi-Fi is switched off, there is no Wi-Fi reception, or the mobile voice device is not connected to Wi-Fi, an authentication message can be triggered. Other possible triggers include, but are not limited to, geo-location being disabled, failure to connect to the Wi-Fi network within X seconds, being outside a geo-fence, being outside or inside a particular area, a change in IP address, and specified inputs from an accelerometer, light sensor, or microphone.

At 512, the server receives the user's reply to the authentication message. This may take place in several ways:

1. The authentication message reply is sent to the server via the Internet from the client software on the paired mobile voice device, after the user provides his decision to an authentication message presented by the client software. This reply may include the code sent at 504.

2. Receiving a notification that the user replied to an SMS authentication message. This can include information such as whether the user replied from the paired mobile voice device.

3. The client software installed on the paired mobile voice device receives the user's decision about the authentication message.

Moving to 513, the system checks the received reply. If the user has chosen to approve or allow, the method proceeds to 508. If the user chooses to deny, go to 514, where authentication is not completed and the system denies access or denies the transaction, or conveys the failure to authenticate to another server.

Authentication can be accomplished in a number of ways. Some examples are:

1. If an authentication message is sent to the server via the Internet, then comparing the code sent to the user at 504 with the code received at 506. If the codes match then the message is authenticated. If the user chooses to approve or allow, go to 508. If the user chooses to deny, go to 514

2. The platform may receive an indication that the user replied to the SMS message sent to the user (see FIG. 7, step 709) The SMS platform captures the mobile phone number the user replied to as well as the phone number the user sent the SMS from, and checks both of the following a. Whether the phone number the user replied to is the same phone number the SMS was sent from.

b. Whether the phone number the user replied is the same phone number the SMS was sent to.

If the reply for both A and B is yes, then the message is authenticated. If the user chooses to approve or allow, go to 508. If the user chooses to deny, go to 514.

The authentication message can receive the user's decision and optionally authenticate the user via biometrics such as a fingerprint, face, or sound. If the user chooses to approve or allow, go to 508. If the user chooses to deny, go to 515.

At 514, access to a web site or a web service is denied, or the denial is communicated in a deny message to a web service. The server ("first server") may communicate a deny message to another web service owned or operated by the same (first) party operating this system, or owned or operated by a second party. Message communication can be by connecting to a second web service over the Internet and transferring the message to the second web service, or by having the second web service connect over the Internet to the first server and requesting the message.

In order to authenticate or to identify communications between a server and a paired mobile voice device, or communications between a first server and a second server, it is possible to add a transaction ID or code to each communication. Adding the code or the transaction ID will assist in identifying or authenticating the communication between the server and the paired mobile voice device or also to identify or authenticate the communication between servers.

Alternatively, in order to authenticate or identify communication between a mobile voice device and a server or communication between servers, it is possible to use key and a secret key; such key and secret key can be a username and a password or an alphanumeric code. The practitioner may choose to combine secret keys, keys with codes, and/or transaction IDs in order to boost the authentication level.

Upon sending a message to a mobile voice device, the server may send the transaction ID, code or key or secret key and, upon reply, the paired mobile voice device will reply with the code, key or secret key. The server may check that the code, secret key or key sent to the paired mobile voice device correlates with the code, secret key or key received from the mobile voice device in order to confirm that the communication is from the proper device. The same verification can be done in communication between servers.

The platform of the present invention can work in several modes:

1. Assign/correlate/associate BSSID (MAC address) and Wi-Fi IP address
 2. Assign/correlate/associate BSSID (MAC address) to computer signature
 3. Assign/correlate/associate BSSID (MAC address) and Wi-Fi IP address to computer signature
 4. Assign/correlate/associate SSID and BSSID to computer signature
 5. Assign/correlate/associate SSID and IP address to computer signature A server may be a computer, where the computer has the capability to communicate with other computers over the Internet, and has the capability to initiate, receive and send authentication messages to mobile voice devices. The computer may be a dedicated server, a general-purpose computer, or a mobile voice device. (cellphone as server?)

When a server receives a reply to a regular notification, and if the user's mobile voice device was connected to Wi-Fi at the time that the user clicked on allow, then the server will receive the Wi-Fi IP address. The server can be informed if the user was connected to Wi-Fi because the server is receiving the reply from the mobile voice device software, and the software has the ability to check whether Wi-Fi is available or not, to access Wi-Fi information such as the Wi-Fi MAC address, and to share that information with the server.

Therefore, if Wi-Fi is enabled, and if the user replies allow to a regular notification message, it is possible to correlate the Wi-Fi IP address with the MLI. The MLI can be a MAC address/BSSID and therefore if the user allowed the transaction it is possible to also correlate the MAC address with the Wi-Fi IP address as received, whether getting a reply to a regular notification or a silent notification.

Correlating the IP address with the MLI will add additional security. In future transactions it will be possible to check that the MLI matches and also that the IP address matches, and if one of them does not match, than an authentication message will be sent. Alternatively, if the IP address doesn't match then it is still possible to allow the transaction if the MAC address matches. Use of the IP address together with MLI to increase confidence is illustrated by the following example.

Upon first access of a user to a web service from a laptop, a first authentication request is sent to a mobile voice device where the mobile voice device is separate from the laptop, and the mobile voice device is paired with at least one user identifier such as username. The server receives the authentication request reply, where the reply is sent from the mobile voice device and where the reply is associated with an IP address captured via the mobile voice device software. If the user allows the first authorization request, then the IP address is associated with the MLI (MLI can be SDWI, geographical information or biometric information) and an allowance of access to the web service is communicated. Upon a second access by the same user, the MLI information and the IP address are received. If the second access request IP address and the MLI match with the first allowed MLI and IP address, access by the user can be granted without sending an authorization request and without any user intervention with the mobile voice device during the second authorization. If the second access request IP address and the MLI do not match with the earlier-allowed authorization MLI and IP address, an authorization request is sent to the user's mobile voice device, and access is granted if the user chooses to allow.

When the server receives the computer signature it is possible to also receive the IP address of the computer signature, where the user is using a computer that is separate from the mobile voice device. The computer can be a desktop, laptop, tablet, iPad, iPhone, Android, mobile voice device or any other device with the capability to communicate over the Internet with another computer and with Internet websites, provided that the computer is capable of having a computer signature. In order to increase security, the platform of the invention can check whether the computer signature IP address matches with the IP Address of the notification (silent/regular) reply from the mobile voice device to the server.

It is also possible to combine both IP methods along with the MLI association. Upon first access of a user to a web service from a computer, the server captures the computer IP address. A first authentication request is sent to a mobile voice device, which is separate from the computer, and the mobile voice device is paired with at least one user identifier such as username. The authentication request reply is sent from the mobile voice device, and is associated with an IP address. At this point, the system has the IP address associated with the computer, and the mobile voice device software MLI. If the user allows the first authorization request, the system can associate at least two of the following:

1) computer IP address,
2) the authorization reply IP address, and
3) MLI (MLI can be SDWI, geographical information or biometric information)

Upon a second access of the same user, second MLI information and a second IP address are obtained, and the system checks if the second IP address and second MLI information match with the first allowed MLI and IP address. If they match, access can be given to the user without sending an authorization request and without having any user intervention with the mobile voice device. If the second IP address and the second MLI do not match with the first allowed MLI and IP address, then an authorization request is sent to the user's mobile voice device, and access is granted only if the user chooses to allow.

As described above, pairing is the process by which a mobile voice device is correlated with a username. More precisely, a unique mobile voice device identifier is correlated with a unique identifier of a user, such as a username, identification card number, phone number, or the like. During the pairing process the mobile voice device transfers a unique mobile voice device identifier associated with that mobile voice device to the server, so that if the server needs to communicate with the mobile voice device after the pairing process, the server can provide the unique mobile voice device identifier to another server, and a regular notification or silent notification can be sent directly to the mobile voice device over the Internet or over the phone network.

A unique mobile voice device identifier can be a unique network mobile voice device identifier, typically a phone number, which allows communication over a telephone network. A unique mobile voice device identifier can be also a unique software identifier associated with that mobile voice device, which allows for communication over the Internet.

Pairing processes suggested by the prior art are done via the Internet, where the user's computer may possess some of the pairing information. Examples include:

A. Presenting a QR code via the computer. A QR code is displayed in the user's browser, the user scans the displayed QR code using client software installed on the user's mobile phone. The QR code is received via the Internet, and the pairing is done via the Internet by sending the QR code and the mobile voice device identifier to the server.

B. Presenting a code with a few alphanumeric characters on the computer. The user has to enter the characters into the mobile phone client application in order to complete the pairing. The code presented on the computer is received via the Internet and the pairing is done via the Internet by sending the code and the mobile voice device identifier to the server.

C. Sending a URL to the user's email address. A URL is sent to the user via email, and the user clicks on the URL from within an email application installed on his mobile phone device. The URL is identified by the client software installed on the user's mobile voice device and the client software installed on the mobile phone will send a unique code captured from the URL along with the mobile phone device identifiers to the server getting the URL, and the pairing is done via the Internet.

All of the methods above use the Internet in order to send pairing information to the client software. The entire pairing process is done via the Internet, the information received for the pairing and the pairing reply is done via the Internet. In addition, since the current methods use the Internet, it is not possible to verify the mobile voice device before pairing it, and the Internet user's identity confirmation is limited. Unlike the prior art methods described above, the method described here sends the pairing link directly to the mobile phone via the phone network, rather than via the Internet, by using the user's mobile voice device phone network number, which can be verified with high confidence. In addition, current pairing methods require many actions (clicks and/or keystrokes) by the user, so that there is a higher chance of mistakes, requiring additional support and contributing to user frustration. Keystrokes are also vulnerable to detection by keylogger malware, which can distribute user names and passwords to hackers and criminals. In addition, sending emails to the user may be subject to filtering and blocking by antivirus or antispam filters. During the testing of this platform, for example, the inventor noticed that Gmail blocked some emails with codes and URLs.

The methods of the present invention pair the user information with a mobile voice device via two channels: the Internet and SMS, where SMS is a separate channel independent from the Internet. Pairing via two channels allows for additional security filters and checks that are not available if the entire pairing process is done via the Internet. Two-channel SMS pairing has several advantages:

1. Verification of the user's phone number and checking of the mobile phone owner information against databases in order to confirm that the owner of the mobile phone is also the owner of an account, such as a bank account or an online account. In some cases, one may choose not to pair a mobile phone device if the mobile phone information does not match the known information for an entity that is using this method for security. For example, the owner of a mobile phone may not match with the owner of an account such as bank account or credit card account, or the mobile phone number associated with a bank account may not match with the mobile phone number the user is using to perform the pairing process. In such cases, the entity that is using this security method can authenticate the user before sending the pairing code to the user. Alternatively, the entity can present the last X digits of the user's mobile phone number, and the only option for the user to pair is by using a mobile device having that number. The user will otherwise be required to provide additional authentication in order to change the authorized pairing mobile phone number, for example by calling the bank and identifying the entity via the phone before the mobile phone number can be changed.

2. SMS is a separate and independent channel from the Internet, which allows for verification that the SMS was sent to a specific phone number, and that may also request an SMS reply from the user in order to verify that the phone number from which the SMS reply originated was the same number. A user will know what the phone number is while a hacker will not know what the number is. An additional level of security is added by asking the user to reply via SMS. In this case the user will be able to reply to the message, while the hacker will not know from which phone number he should reply in order to activate the account or the pairing.

3. User simplicity: The method presented in the following application requires, depending on the configuration, either two clicks or only one click by the user in order to pair their device. Current pairing methods require several clicks by the user, such as entering a six-digit number or even QR. Another option will include sending a link via SMS. Once the SMS containing the specific link that is recognizable by the client software is received by the mobile device, the pairing will take place automatically in the background without user intervention, such as additional clicking.

4. Pairing done via email is subject to anti-spam filters as well as anti-virus filters. During the testing of this system we have seen Gmail often blocking client software unique URLs. In other instances during testing we saw emails arrive, but with disabled links, so that there had to be additional user intervention in order to activate the link. With this method, the user will receive an SMS, thus bypassing anti-spam or anti-virus filters, and avoiding getting disabled links.

Figure 6:
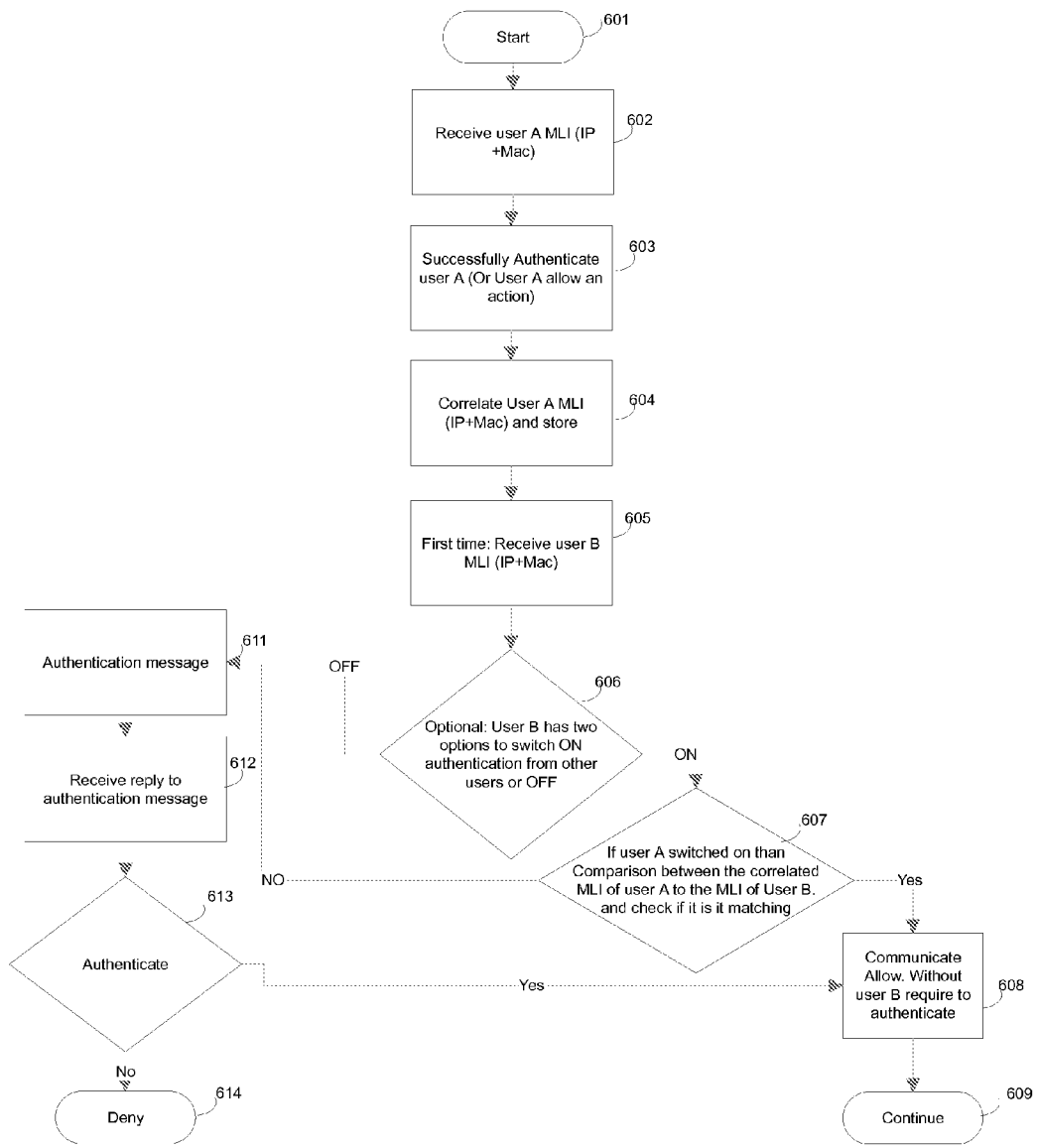
FIG. 6 is a flowchart showing the steps in a method for authenticating a user using SDWI acquired by another user.

Turning to FIG. 6, a method of authentication is shown where a second user can be authenticated on the basis of MLI and identifiers previously authenticated by a first user.

At 601, the process is initiated when a first user (user A) logs onto a system. At 602, the server receives user A's MLI, as described elsewhere in this disclosure, and also receives the computer's IP address (which is likely a router's IP address) and MAC addresses of one or both of the computer and router.

At 603, user A successfully authenticates, by any of the prior art or presently described methods.

At 604, the system correlates and stores user A's MLI with the IP and MAC addresses.

At 605, user B logs in on the same computer, or on another computer using the same router. The system receives user B's MLI and IP and MAC addresses, and notes that a correlation of this information exists for user A. A message, e.g. via SMS, is sent to user B, asking if he wishes to turn on authentication based on the previous user's associations. If user B declines, the system goes on to steps 611, 612, and 613, for routine authentication by other means. This may fail, leading to 614, or succeed, leading to 608.

If user B elects to use the prior user's associations, the method moves on to 607, where his data are matched to user A's data. A mis-match leads to 613, while a match leads to 608, where the user is allowed to proceed without having to authenticate himself.

Figure 7:
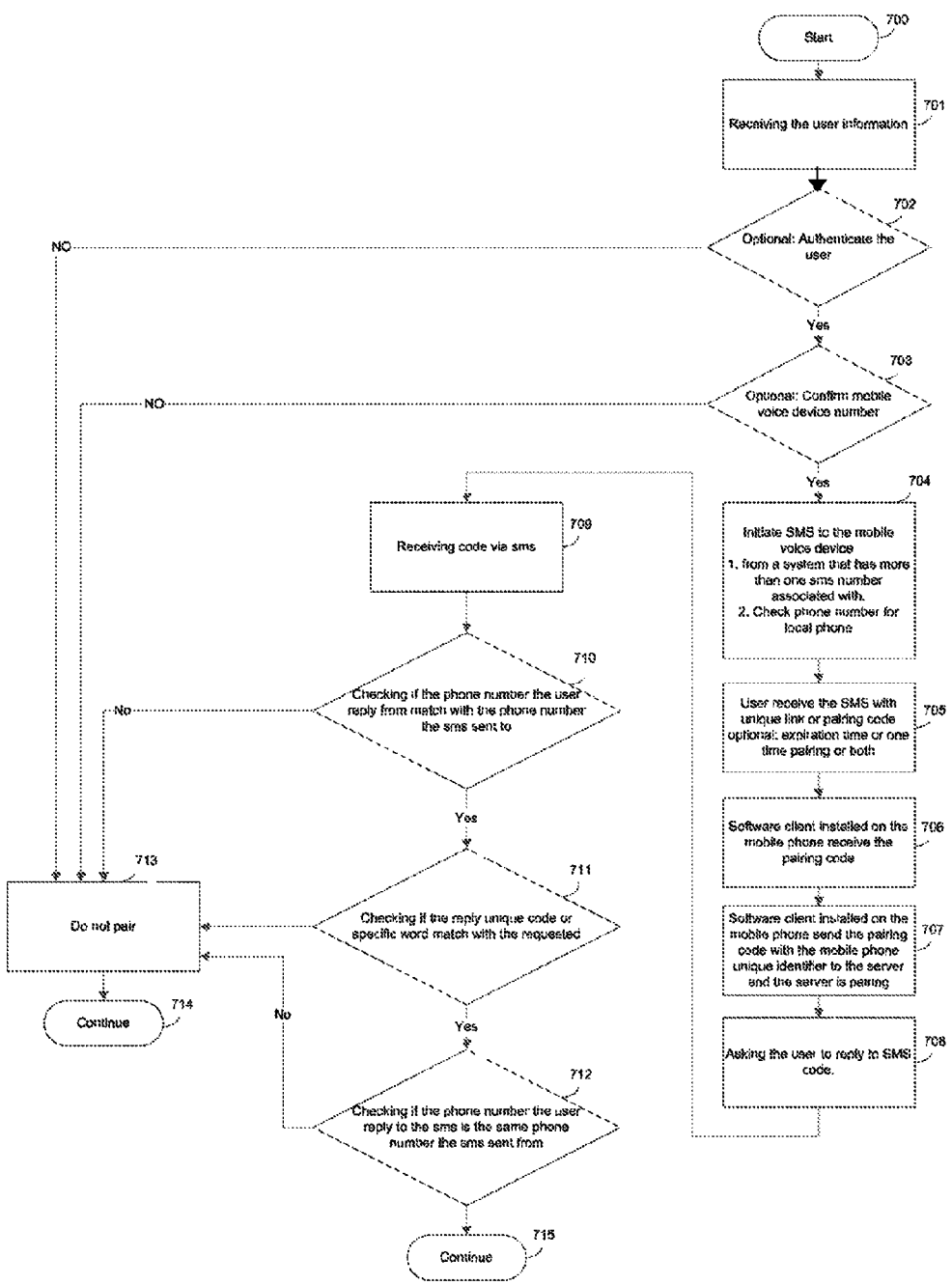
FIG. 7 is a flowchart showing a pairing process via SMS while checking security in layers.

Briefly, the pairing method of the invention comprises the following steps, as illustrated in FIG. 7. Additional steps may be executed, and the order of the steps may be altered to a limited extent, without departing from the scope of the invention:

1. Receive a mobile voice device's phone number.
2. Receive the Internet user username, or get other unique user identifier.
3. Initiate SMS transfer to the mobile voice device, where the SMS message (a) originates from a phone number local to the user's phone number, (b) contains a unique access link to a website that is associated with a unique pairing code, and where (c) the unique access link is not sent via the Internet.
4. Receive a message that contains the unique pairing code and unique mobile voice device identifier, where that message is sent from software installed on the mobile voice device and is sent to a server.
5. Request that the user reply via SMS with a specific code.
6. Receive the user's reply via SMS with the specific code
7. Receive from the mobile voice device the phone number from which the user replies via SMS.
8. Receive the mobile voice device the phone number from which the user received the message replied to at step 6.
9. Check if the phone number from which the user replies matches with the phone number the SMS was sent to.
10. Check whether the unique code in the reply matches with the specific code requested at step 5.
11. Check whether the phone number the user replied to is the phone number the SMS was sent from.
12. If the user's reply at step 6 matches the requested code from step 5, and if the phone number the user replies from matches the phone number the SMS sent to, and if the phone number the user replies to matches the phone number the SMS was sent from, then take action such as activating the user's account, or pairing the user's mobile device with the username. The method of the present invention for pairing a user with an account is more secure than prior art methods, because a code of 32 or 64 characters (both letters and numbers) can be sent via the link, as part of the link, i.e., embedded within the url. By way of example, a 32-character pairing code according to the present invention may take the following form: spriv://5D56933F272B4F7EBC66B22B872F6DFD.

Currently, pairing is commonly done using six-digit code verification. Pairing by entering six digits requires user effort and offers a maximum of a million combinations, whereas 32- or 64-character codes have billions or trillions of permutations, making them much less vulnerable to cracking than six-digit pairing codes. In addition, by having an effectively unlimited variety of pairing codes, the system can provide many more unique pairing codes or, alternatively, keep pairing codes active for a longer time.

This method is preferred to QR pairing because it also allows for verification that a unique link was sent to the particular user's phone number and allows an additional layer of security that is not possible via QR or by presenting a pairing code via the Internet.

In order to increase security, a requirement that the user reply to the SMS with a specific code can be added. A specific code can be a specific word, a combination of letters such as "HGTRED", a combination of numbers such as "12585327", a combination of numbers and letters such as "6539JHJH". There is no limitation as to how many characters the code contains. The code can be one character or it can be a number of characters or, alternatively, the code can be one or more icons, such as a smiley face.

The SMS platform is separate from the Internet and from the client software installed on a mobile voice device. Using SMS allows us to check the phone number owner information and address in order to make sure that the right person gets the SMS. Such level of verification is not possible when pairing information is presented over the Internet or sent to the user over the Internet.

Upon the user's reply with the specific code via SMS, the platform will receive the following information from the mobile phone carrier or SMS aggregator:
1. The specific code in the user's reply via SMS.
2. The phone number the user replies from.
3. The phone number that the user replies to.

For additional security the platform can check the following:
1. Did the user reply with the correct requested code?
2. Does the phone number the user replied from match with the phone number the SMS was sent to?
3. Does the phone number that the user replied to match with the phone number the SMS was sent from?

If the reply to the questions above is yes then the account can be activated or paired.

Turning now to FIG. 7, at step 701, the server receives the user information. As mentioned above, the tem "user" encompasses "Internet user". The user information can be one or more of user's credentials such as username, password, phone number, credit card number, debit card number, identification number, computer unique identifier, computer fingerprint, MLI, SDWI, IP Address, user biometric identifier such as fingerprint, voice, face, or iris scan, or any other user identifier disclosed upon accessing an Internet site. The next step may be any of steps 702, 703 or 704.

At 702, the first authentication of the user is done by authenticating the user information received at 1. The authentication may be accomplished by any of the methods known in the art. Another server, owned by a different entity, can do the authentication step or, alternatively, the authentication can be done by the same entity carrying out step 1. The next step may be step 703 or step 704.

At 703, a practitioner of this method can verify the user's phone number by one or more of the following methods:
A. Present to the user a portion of the mobile phone number and ask the user to complete the phone number and then check whether the user provides the correct phone number.
B. Request the user to provide the entire phone number and check whether the user provides the correct phone number.
C. Reverse lookup of the phone number with another database to verify that the owner of the phone number correlates with the user information.
D. Present a few phone numbers and request that the user choose the correct phone number.

If the phone number is confirmed, the method proceeds to step 704.

At 704, an SMS to the mobile voice device is initiated from a system that has more than one SMS number associated with it. It is recommended that the system have more than one SMS number associated with it, so that hackers and fraudsters will not be able to know from which SMS number the message was sent at step 704. A local phone number is preferably used to initiate the SMS to the user's phone number. This method may communicate via API or XML or any other software programming language with the mobile phone carriers, or with an aggregator that can provide an SMS sending and receiving platform in order to send and receive SMS to mobile phone numbers around the world. The practitioner may request to use more than one local phone number per country. Fore example, if there are more transactions in the United States than in Italy, one may choose to use 40 different local phone numbers in United States and 10 different local phone numbers in Italy, so that the system will be able to send the SMS from 40 different local phone numbers in the United States and 10 different local phone numbers in Italy. It is preferred that the system send the SMS from a local phone number than from an international phone number, in order to avoid international SMS fees for the user when replying via SMS.

As noted above, having multiple numbers in the SMS platform will make it harder for fraudsters to know from which SMS number the SMS message was sent. The process by which the SMS is initiated can be chosen from methods such as round robin or programmed methods, which ensure that an SMS will be sent from one number with the following SMS being sent from a different number that does not follow the first number in line. By randomly skipping among multiple phone numbers, another level of security against fraudsters is provided by making it difficult to know the number from which any one SMS originated. Initiating an SMS from a phone number that is unpredictable or from a phone number that was not used in the past reduces the chances of hacking the platform. Therefore, one may choose to add new SMS phone numbers into a platform, while either retiring SMS phone numbers that have been used in the past, or "resting" them for a period of time.

Sending a unique website access link via SMS to the user's mobile voice device, rather than via the Internet, substantially reduces the chances that hackers will be able to get the pairing code. A pairing code should not be presented on the same channel that the system relies on to authenticate it. For example, if a pairing code is presented on a computer, and the computer is infected with spyware or is controlled by a hacker, then the hacker would be able to get the pairing code, and he would be able to use it with the computer signature information. On the other hand, sending the code as a link via SMS to the user via his mobile phone prevents such a risk. When the user uses the unique link to access a website, the website will know the user's mobile voice device computer signature and correlate that information with the user, while a hacker who is not in possession of that particular mobile phone will not be able to impersonate the user. As noted above, the computer signature is sent to the website at the time the user accesses a website. The computer signature can be one or more of the IP address, MAC address, unique software identifier, unique hardware identifier, common software identifier and common software identifier. Similarly combining a few such identifiers allows the creation of a unique computer signature for the user's mobile voice device as well.

At 705, the user receives an SMS with a unique access link to a website or the pairing code. Additional features can be added as options, such as an expiration time for the unique access link, and/or one-time pairing. The user receive an SMS message with a unique access link to a website, such as for example the following text:

Welcome to Spriv. Please click on the following link: https://m.spriv.com/Pair?ID=5F9B0B22CA804CAAA4AE7DB21A8411BC Alternatively the user may receive the pairing code with the application name. If the application name is "Spriv" and the pairing code is "76t6w65w679jkj9dd" then the pairing code will look like: Spriv://76t6w65w679jkj9dd Since the pairing code and the website link can be more than 32 characters of numbers and letters, and thereby provide many billions of unique codes, it is possible to provide the web site link and the pairing code only once, and once pairing is completed, the pairing code and web link are never to be used or made available again in the future.

It is possible to make the link available for a fixed number of hours, such as for example: "this web link will be available to the user for only 24 hours". After 24 hours the link will no longer be available and/or will no longer function.

Also, once the user successfully pairs his mobile voice device using a specific pairing code, that pairing code can be made no longer be available and/or no longer functional. It is possible to make the client software pairing link available for clicking only once, so once the user clicks on it, if a second user clicks on the same link it will no longer pair, or the client software pairing code will be blocked or not available. Another option may be that once the user completes the pairing then the unique access link to a website or the pairing code or both will no longer be available.

At 706, client software installed on the mobile phone receives a pairing code via the Internet. Once the user clicks on the unique access link to a website from his mobile voice device the user will be directed to a unique page in a website. For example, the user may receive the following unique access link to a website via SMS:

https://m.spriv.com/Pair?ID=5F9B0B22CA804CAAA4AE7DB21A8411BC

The user clicks on the unique access link, and is directed to a website. In the website the user can see the following message: "to pair your mobile phone with your username please click on the 'Pairing' link". The Pairing link contains the client software name and a pairing code, for example: Spriv://76t6w65w679jkj9dd. When the user clicks on the pairing link on the mobile voice device, the client software receive a unique pairing code via the Internet There are few options for pairing the mobile phone:

A. The user accesses the web link and clicks on a pairing code. Using this method the user will be required to click on the web link and then click on the pairing code and then the client software will receive the pairing code.

B. If the SMS does not contain a web link and the SMS contains only the pairing code, the user can click on the pairing code directly from the SMS and then the client software would receive the pairing code. Using this method the user will need to click only on the pairing code presented via SMS and then the client software will receive the pairing code.

C. If the SMS does not contains a web link and the SMS contains only the pairing code, the client software installed on the mobile voice device identifies the pairing code because the pairing code contains a client software identifier. For example, if the pairing code is "Spriv://76t6w65w679jkj9dd", the application name is "Spriv" and the pairing code is "76t6w65w679jkj9dd". Using this method the client will not need to click on the pairing code at all, because the application would automatically identify the pairing code in the background. Using this method the pairing will complete automatically in the background without user intervention.

At 707, the client software installed on the mobile device sends the unique pairing code together with the mobile phone unique identifier. Once the mobile device receives the unique pairing code the client software sends two unique identifiers to the server: the pairing code, and the mobile voice device unique identifier. The server receives the pairing code and the mobile voice device unique identifier from the client software, and the server pair the user's information received during step 701 with the mobile voice device identifier.

At 708, the user is asked to reply via SMS with a specific code. A first SMS will request that the user reply with a specific word or a code. For example, "Pairing with Spriv completed successfully. Please reply 'Yes' to activate your account". As another example: "Please reply 'HGYT897' to activate your account". The first SMS includes the unique access link to a website and can also include a request to reply with a specific code. Alternatively, the request to reply with a specific code could be sent in a second SMS. Another option would be to initiate a second SMS message to the user once the pairing is completed successfully. In this embodiment, the second SMS can be initiated automatically once the user completes the device pairing successfully, meaning that once the server receives the pairing code and mobile voice device unique identifier from the client software and the device pairing is completed successfully, then a second SMS message is initiated requesting the user to reply via SMS with a code sent in the second SMS.

At 709, once the user sends an SMS back (e.g., with the reply word "yes" or the code "HGYT897"), the system will have available two important pieces of information: (a) the phone number from which the user replied to the SMS, and (b) the SMS phone number to which the user sent the reply.

At 710, the system checks whether the phone number the user replied from matches with the phone number the SMS was sent to. In step 704 the system sent an SMS to the user's phone number and in step 709 the system received the user's reply where the phone number the user sent the SMS from can be seen. In step 710, the system will check that the phone number that the user replied from matches the phone number the system sent the SMS to. If the phone numbers match then the system proceeds to 711. If the phone numbers do not match the system does not pair the mobile device, and the system may generate alert messages to the user and/or the server.

At 711, the system checks whether the code in the reply matches with the requested code. In step 708 the system sent an SMS to the user's mobile voice device with a code and requested the user to reply back with the code. In step 709 the system received the user's reply. In step 711 the system will check whether the user's reply as received in step 709 matches with the code requested from the user to reply in step 708. If both match, the system proceeds to step 712. If both do not match, the system does not pair the mobile device, and the system may generate alert messages to the user and/or the server.

At 712, the system checks whether the phone number the user's SMS reply was sent to is the same phone number that the requesting SMS was sent from. In step 704 the system generated an SMS from a list of more than two phone numbers (the more phone numbers, the better). The system may select a phone number to send the SMS from by "round robin" or by programmatically/randomly skipping or jumping among the available SMS originating phone numbers.

In Step 709 the system received the user's reply and the system has the phone number the user replied to. In step 711 the system checks that the phone number the system used to send the SMS to the user's mobile voice device matches with the SMS phone number the user replied to.

Initiating an SMS message that contains a unique access link to a website, rather than transmitting the unique access links via the Internet to a user's device, substantially reduces the risk of an unauthorized person capturing the unique access link, while also increasing the chances that the user will receive the information without being blocked by e-mail filters, and allows the user to access the site with one simple click or in some cases with no clicks at all. At the same time, replying to the SMS by itself, without completing the rest of the steps, will not activate the account or result in pairing. Security is substantially increased by checking the user's phone number and the phone numbers the user is interacting with before and during the pairing.

I claim:

1. A computer-implemented method of controlling the access of an Internet user to conduct a transaction via a website, where the user has access to a mobile voice device that is paired with an identifier of the user, and is in communication with the website via a computer having a computer signature, the method comprising the computer-implemented steps of:
   a. receiving the computer signature;
   b. receiving an identifier of the user;
   c. checking whether the computer signature is stored in a database;
   d. sending a notification from a server to the mobile voice device that is paired with the identifier received in step (b), which causes the mobile voice device to acquire and report available Short Distance Wireless Information (SDWI);
   e. if SDWI is not available, then attempting to authenticate the transaction, and if the transaction is authenticated then communicating an indication of success to the web site; or
   f. if the stored computer signature is correlated in the database with stored SDWI that matches the SDWI acquired at step (d), then communicating an indication of success to the website; and
   g. if the stored SDWI does not match the SDWI acquired at step (d), then attempting to authenticate the transaction, and if the transaction is authenticated then communicating an indication of success to the website, and correlating the computer signature in the database with the SDWI acquired at step (d).

2. The method of claim 1, wherein the SDWI is an IP address of a wireless device that is independent and separate from both the mobile voice device and the computer.

3. The method of claim 1, wherein the SDWI is at least one identifier of a wireless device that is independent and separate from both the mobile voice device and the computer.

4. The method of claim 3, wherein the SDWI comprises at least one of:
   a. Wi-Fi MAC address;
   b. Wi-Fi SSID; and
   c. Wi-Fi signal strength.

5. The method of claim 1, wherein the user is not presented with an option to automate future transactions.

6. The method of claim 1, wherein the process of authenticating the transaction in steps (e) and (g) is performed by the software installed on the mobile voice device.

7. The method of claim 6, wherein the user is not presented with an option to automate future transactions.

8. The method of claim 1, further comprising the step of receiving an indication of a change in SDWI during an active session in which the transaction has been authenticated, and if the received SDWI is not correlated with the computer signature, sending notification to the mobile voice device or to a server.

9. The method of claim 1, wherein the process of authenticating the user in steps (e) and (g) is done by presenting options to the user, via the software installed on the mobile voice device, the options including at least one of:
   a. the option to approve or not approve the transaction; and
   b. the option to use the association of SDWI and computer signature of another user; but not including
   c. an option to automate future transactions.

10. The method of claim 9, wherein the software installed on the mobile voice device presents to the user an option to delete from the database the correlation of the computer signature with the stored SDWI.

11. The method of claim 1, wherein if the access to the website in steps (e) and (g) is successfully authenticated, then the acquired SDWI is correlated in the database with the computer signature.

12. The method of claim 1, wherein the process of authenticating the user in steps (e) and (g) is done by presenting to the user, via the software installed on the mobile voice device, two options, and wherein if the user chooses to allow access to the website, then all future access to the website that are characterized by the same computer signature and the same acquired SDWI are allowed automatically.

13. The method of claim 1, wherein in step (d), if the SDWI is not available or is not reported within a pre-set period of time, the method further comprises the step of sending a notification to the mobile voice device.

14. The method of claim 1, wherein the received SDWI is correlated in the database with the computer signature only if the SDWI is that of a Wi-Fi device that is protected by a password and is using encrypted communications.

15. The method of claim 1, wherein the stored and correlated SDWI and computer signature were correlated by a prior user who is not the current user, and the prior user was granted access to the website.

16. The method of claim 1, wherein the match in step (f) is between the SDWI and computer signature of a prior user granted access to the website, and the SDWI and computer signature of the current user, and if both match then allowing access to the current user.

17. The method of claim 1, wherein in step (d) the notification sent to the user is a silent notification which does not alert the user that the notification arrived.

18. The method of claim 1, further comprising the step of receiving an indication of a change in SDWI during an active session in which the transaction has been authenticated, and if the received SDWI is not correlated with the computer signature, then attempting to authenticate the-transaction, and if the transaction is authenticated then communicating an indication of success to the website.

* * * * *